United States Patent
Hwang et al.

(10) Patent No.: US 11,477,850 B2
(45) Date of Patent: Oct. 18, 2022

(54) COMMUNICATION METHOD AND DEVICE OF TERMINAL IN WIRELESS COMMUNICATION SYSTEM

(71) Applicant: Samsung Electronics Co., Ltd., Suwon-si (KR)

(72) Inventors: June Hwang, Incheon (KR); Sangwook Kwon, Suwon-si (KR); Anil Agiwal, Suwon-si (KR); Hyunjeong Kang, Seoul (KR); Beomsik Bae, Suwon-si (KR); Sangkyu Baek, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 16/906,526

(22) Filed: Jun. 19, 2020

(65) Prior Publication Data

US 2020/0323033 A1    Oct. 8, 2020

Related U.S. Application Data

(63) Continuation of application No. 15/753,777, filed as application No. PCT/KR2016/009166 on Aug. 19, 2016, now Pat. No. 10,694,580.

(30) Foreign Application Priority Data

Aug. 21, 2015 (IN) .............................. 4378/CHE/2015
Jan. 15, 2016 (KR) ........................ 10-2016-0005486
(Continued)

(51) Int. Cl.
*H04W 88/06* (2009.01)
*H04W 24/02* (2009.01)
(Continued)

(52) U.S. Cl.
CPC ........... *H04W 88/06* (2013.01); *H04W 24/02* (2013.01); *H04W 24/10* (2013.01); *H04W 40/18* (2013.01);
(Continued)

(58) Field of Classification Search
CPC ..... H04W 88/06; H04W 24/02; H04W 24/10; H04W 48/16; H04W 76/10; H04W 48/18
See application file for complete search history.

(56) References Cited

U.S. PATENT DOCUMENTS

| 8,825,046 | B2 | 9/2014 | Borran et al. | |
|---|---|---|---|---|
| 2004/0185864 | A1* | 9/2004 | Balachandran ....... | H04W 28/22 455/452.2 |

(Continued)

FOREIGN PATENT DOCUMENTS

| EP | 1618748 A4 | 10/2011 |
|---|---|---|
| EP | 2509242 A1 | 10/2012 |

(Continued)

OTHER PUBLICATIONS

Catt, "Discussion on the Feedback Framework for Beamformed CSI-RS," R1-154226, 3GPP TSG RAN WG1 Meeting #82, Beijing, China, Aug. 15, 2015.

(Continued)

*Primary Examiner* — Ayanah S George
(74) *Attorney, Agent, or Firm* — Jefferson IP Law, LLP

(57) ABSTRACT

Disclosed is a 5G or pre-5G communication system for supporting a data transmission rate higher than that of a 4G communication system such as LTE. A communication method of a terminal in a wireless communication system, which includes a first base station supporting first wireless communication and a second base station supporting second wireless communication, can comprise the steps of: performing data communication though the first wireless com- (Continued)

munication with the first base station; receiving, from the first or second base station, configuration information for second wireless communication connection; reporting, to the first or second base station, the result of measurement on at least one beamforming reference signal having been received from the second base station, on the basis of the configuration information; and establishing the second wireless communication connection with the second base station on the basis of the measurement result.

16 Claims, 23 Drawing Sheets

(30) Foreign Application Priority Data

Feb. 5, 2016 (KR) .................. 10-2016-0014963
Mar. 31, 2016 (IN) ................ 201641011346

(51) Int. Cl.
| | |
|---|---|
| H04W 24/10 | (2009.01) |
| H04W 76/10 | (2018.01) |
| H04W 48/16 | (2009.01) |
| H04W 40/18 | (2009.01) |
| H04W 76/28 | (2018.01) |
| H04W 76/16 | (2018.01) |
| H04W 76/27 | (2018.01) |
| H04W 74/08 | (2009.01) |
| H04W 48/18 | (2009.01) |
| H04W 36/00 | (2009.01) |
| H04W 8/24 | (2009.01) |
| H04W 48/12 | (2009.01) |
| H04W 48/02 | (2009.01) |

(52) U.S. Cl.
CPC ....... *H04W 48/16* (2013.01); *H04W 74/0833* (2013.01); *H04W 76/10* (2018.02); *H04W 76/16* (2018.02); *H04W 76/27* (2018.02); *H04W 76/28* (2018.02); *H04W 8/24* (2013.01); *H04W 36/0069* (2018.08); *H04W 48/02* (2013.01); *H04W 48/12* (2013.01); *H04W 48/18* (2013.01); *Y02D 30/70* (2020.08)

(56) References Cited

U.S. PATENT DOCUMENTS

| | | | |
|---|---|---|---|
| 2005/0181799 | A1 | 8/2005 | Laroia et al. |
| 2009/0163240 | A1 | 6/2009 | Ryu et al. |
| 2009/0316586 | A1 | 12/2009 | Yi et al. |
| 2013/0010716 | A1 | 1/2013 | Dinan |
| 2013/0169481 | A1 | 7/2013 | Takatsuka et al. |
| 2013/0223251 | A1 | 8/2013 | Li et al. |
| 2013/0287132 | A1 | 10/2013 | Taoka et al. |
| 2014/0073329 | A1* | 3/2014 | Kang .................. H04W 36/30 455/439 |
| 2014/0092800 | A1 | 4/2014 | Cho et al. |
| 2016/0007355 | A1 | 1/2016 | Cordeiro et al. |
| 2016/0291127 | A1 | 10/2016 | Huang et al. |
| 2017/0150384 | A1 | 5/2017 | Rune et al. |

FOREIGN PATENT DOCUMENTS

| | | |
|---|---|---|
| KR | 10-2013-0017710 A | 2/2013 |
| KR | 10-1339849 B1 | 12/2013 |
| KR | 10-1377609 B1 | 3/2014 |
| KR | 10-2014-0129051 A | 11/2014 |
| WO | 2003-017539 A1 | 2/2003 |
| WO | 2015174904 A1 | 11/2015 |
| WO | WO-2016118117 A1 * | 7/2016 ............. H04W 4/70 |

OTHER PUBLICATIONS

Indian Office Action dated Aug. 19, 2020, issued in a counterpart an Indian Application No. 201837006338.
Indian Office Action dated Jul. 4, 2022, issued in a counterpart an Indian Application No. 201837006338.

\* cited by examiner

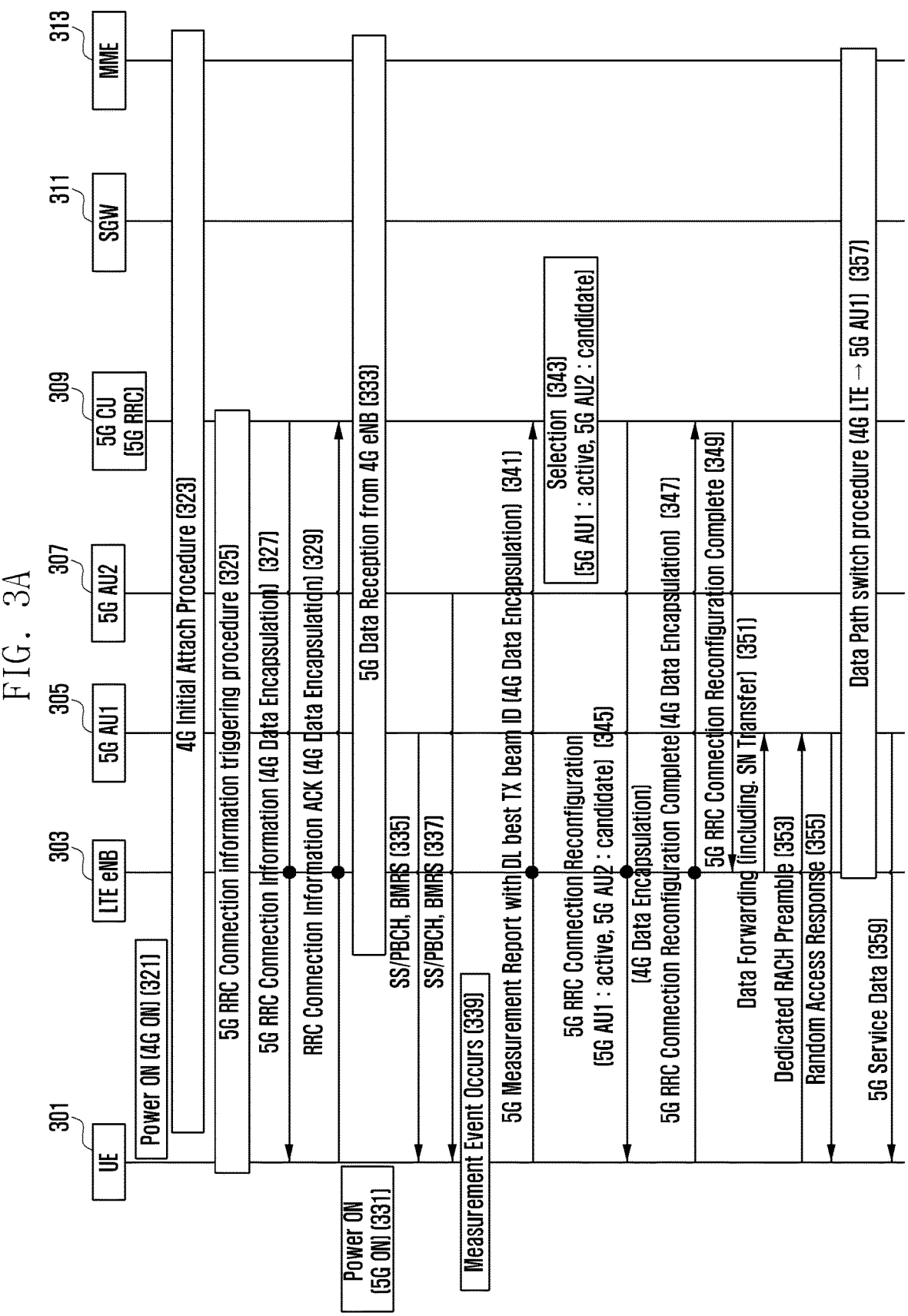

COMMUNICATION METHOD AND DEVICE OF TERMINAL IN WIRELESS COMMUNICATION SYSTEM

CROSS-REFERENCE TO RELATED APPLICATION(S)

This application is a continuation Application of prior application Ser. No. 15/753,777, filed on Feb. 20, 2018, which is a U.S. National Stage application under 35 U.S.C. § 371 of an International application number PCT/KR2016/009166, filed on Aug. 19, 2016, which will be issued as U.S. Pat. No. 10,694,580 on Jun. 23, 2020, which is based on and claimed priority of a Indian patent application number 4378/CHE/2015, filed on Aug. 21, 2015, in the Indian Intellectual Property Office, and claimed priority of a Korean patent application number 10-2016-0005486, filed on Jan. 15, 2016, in the Korean Intellectual Property Office, and claimed priority of another Korean patent application number 10-2016-0014963, filed on Feb. 5, 2016, in the Korean Intellectual Property Office and claimed priority of another Indian patent application number 201641011346, filed on Mar. 31, 2016, in the Indian Intellectual Property Office, the entire disclosure of each of which is hereby incorporated by reference herein in its entirety.

TECHNICAL FIELD

The present invention relates to a communication method and apparatus of a terminal in a $5^{th}$ generation (5G) wireless communication system.

BACKGROUND ART

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system.

Consideration is being given to implementing the 5G communication system in millimeter wave (mmW) frequency bands (e.g., 60 GHz bands) to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna.

Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation.

Furthermore, the ongoing research includes the use of hybrid frequency shift keying (FSK) and quadrature amplitude modulation (QAM){FQAM} and sliding window superposition coding (SWSC) as advanced coding modulation (ACM), filter bank multi-carrier (FBMC), non-orthogonal multiple access (NOMA), and sparse code multiple access (SCMA).

Many discussions are underway concerning the initial access of a terminal in a 5G system.

DISCLOSURE OF INVENTION

Technical Problem

The present invention provides a 5G network access method of a terminal in the course of data communication through a $4^{th}$ generation (4G) network in a wireless communication system supporting both 4G and 5G.

Also, the present invention provides an initial access method of a terminal to a 5G network for data communication.

Solution to Problem

In accordance with an aspect of the present invention, a communication method of a terminal in a radio communication system including a first base station supporting a first radio communication and second base station supporting a second radio communication includes performing data communication through the first radio communication with the first base station, receiving configuration information for second radio communication connection from the first or second base station, reporting a measurement result on at least one beamform reference signal received from the second base station to the first or second base station based on the configuration information, and configuring the second radio communication connection with the second base station based on the measurement result.

In accordance with another aspect of the present invention, a communication method of a first base station in a radio communication system including the first base station supporting a first radio communication and a second base station supporting a second radio communication includes performing data communication with the terminal connected through the first radio communication, transmitting to the terminal configuration information for a second radio communication connection, and receiving a measurement result from the terminal, the measurement result being generated based on at least one beamforming reference signal transmitted by the second base station based on the configuration information.

In accordance with another aspect of the present invention, a communication method of a second base station in a radio communication system including a first base station supporting a first radio communication and the second base station supporting a second radio communication includes transmitting configuration information for a second radio communication connection to a terminal performing data communication with the first base station through the first radio communication, receiving a measurement result generated in association with at least one beamforming reference signal based on the configuration information, and configuring the second radio communication connection to the terminal based on the measurement result.

In accordance with another aspect of the present invention, a terminal in a radio communication system including a first base station supporting a first radio communication and a second base station supporting a second radio communication includes:

a transceiver configured to transmit/receive a signal and a processor configured to control to perform data communication through the first radio communication with the first base station, to receive configuration information for a second radio communication connection from the first or second base station, to report a measurement result on at least one beamform reference signal received from the second base station to the first or second base station based on the configuration information, and to configure the second radio communication connection with the second base station based on the measurement result.

In accordance with another aspect of the present invention, a first base station in a radio communication system including the first base station supporting a first radio communication and a second base station supporting a second radio communication includes a transceiver configured to transmit/receive a signal and a processor configured to perform data communication with the terminal connected through the first radio communication, to transmit configuration information for a second radio communication connection to the terminal, and to receive a measurement result from the terminal, the measurement result being generated based on at least one beamforming reference signal transmitted by the second base station based on the configuration information.

In accordance with still another aspect of the present invention, a second base station in a radio communication system including a first base station supporting a first radio communication and the second base station supporting a second radio communication includes a transceiver configured to transmit/receive a signal and a processor configured to transmit configuration information for a second radio communication connection to a terminal performing data communication with the first base station through the first radio communication, receive a measurement result generated in association with at least one beamforming reference signal based on the configuration information, and configure the second radio communication connection to the terminal based on the measurement result.

Advantageous Effects of Invention

The present invention is advantageous in terms of facilitating 5G network access of a terminal connected to a 4G network. Also, the present invention is advantageous in terms of facilitating initial access of a terminal to a 5G network.

BRIEF DESCRIPTION OF DRAWINGS

FIG. 3A is a signal flow diagram illustrating an initial access procedure of a UE in a 5G system according to another embodiment of the present invention;

MODE FOR THE INVENTION

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

Before undertaking the detailed description of the present invention below, it may be advantageous to set forth definitions of certain words and phrases used throughout the specification. However, it should be noted that the words and phrases are not limited to the exemplary interpretations herein.

Figure 1:
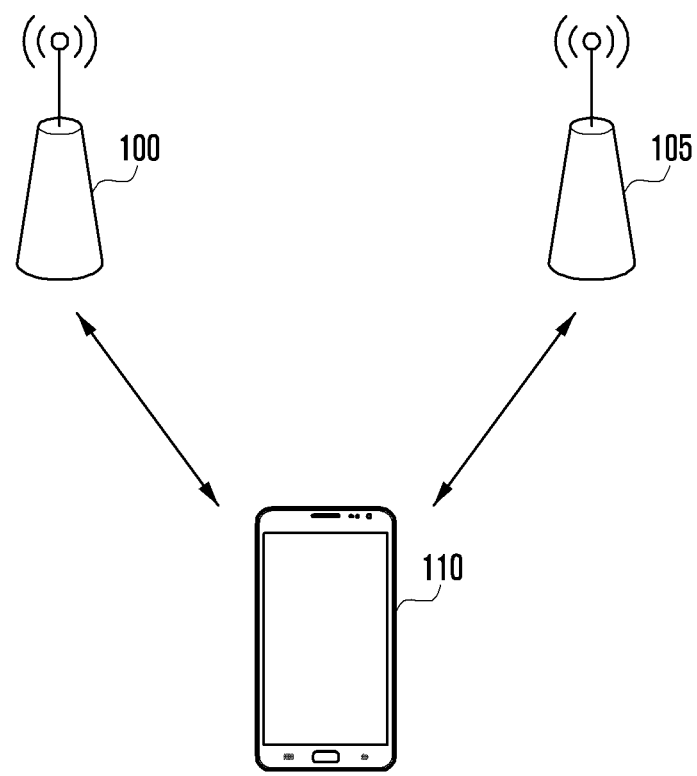
FIG. 1 is a schematic diagram illustrating a wireless communication supporting 4G and 5G.

In reference to FIG. 1, a wireless communication system may include a 4G base station 100 (e.g., LTE eNB) and a 5G base station 105 for serving a terminal 110. The terminal 110 may include an LTE modem for supporting LTE communication and a 5G modem for supporting 5G communication and perform data communication with a server through at least one of 4G and 5G communication networks.

In the following description, the term "4G communication" may be interchangeably referred to as "LTE communication" and "first radio communication," and the term "5G communication" may be interchangeably referred to as "second radio communication." In the following description, the term "non-standalone system" may denote a wireless communication system capable of providing both the 4G and 5G services, and the term "standalone system" may denotes a wireless communication system capable of providing only the 5G service. According to an embodiment of the present invention, the terminal may perform an access procedure to the 4G network via the LTE eNB and transmit 5G capability information of the terminal to the LTE eNB or the 5G base station in the 5G initial access procedure in the proposed non-standalone system. The 5G capability information of the terminal may be conveyed in the terminal subscription information (e.g., international mobile equipment identity (IMEI)) and aggregate maximum bitrate (AMBR). Upon identification of the 5G-capable terminal, the LTE eNB or the 5G base station may transmit 5G cell configuration information and 5G cell measurement configuration information to the terminal. The terminal may transmit to the base station the 5G radio capability information (e.g., supportable carrier aggregation configuration, supportable MIMO configuration, and supportable beamforming configuration).

The terminal may perform 5G cell measurement based on the 5G cell configuration information and 5G cell measurement configuration information and transmit the 5G cell measurement result to the 5G base station. The 5G base station may transmit the 5G base station information for use by the terminal in accessing the 5G system based on the 5G cell measurement result of the terminal. The 5G base station and gateway may configure a 5G data bearer for providing the terminal with a 5G service. Afterward, the 5G base station may provide the terminal with the 5G service through the 5G data bearer.

Hereinafter, a description is made of the 5G initial access procedure of a terminal in a non-standalone system with reference to FIGS. 2, 3A, and 3B.

Figure 2:
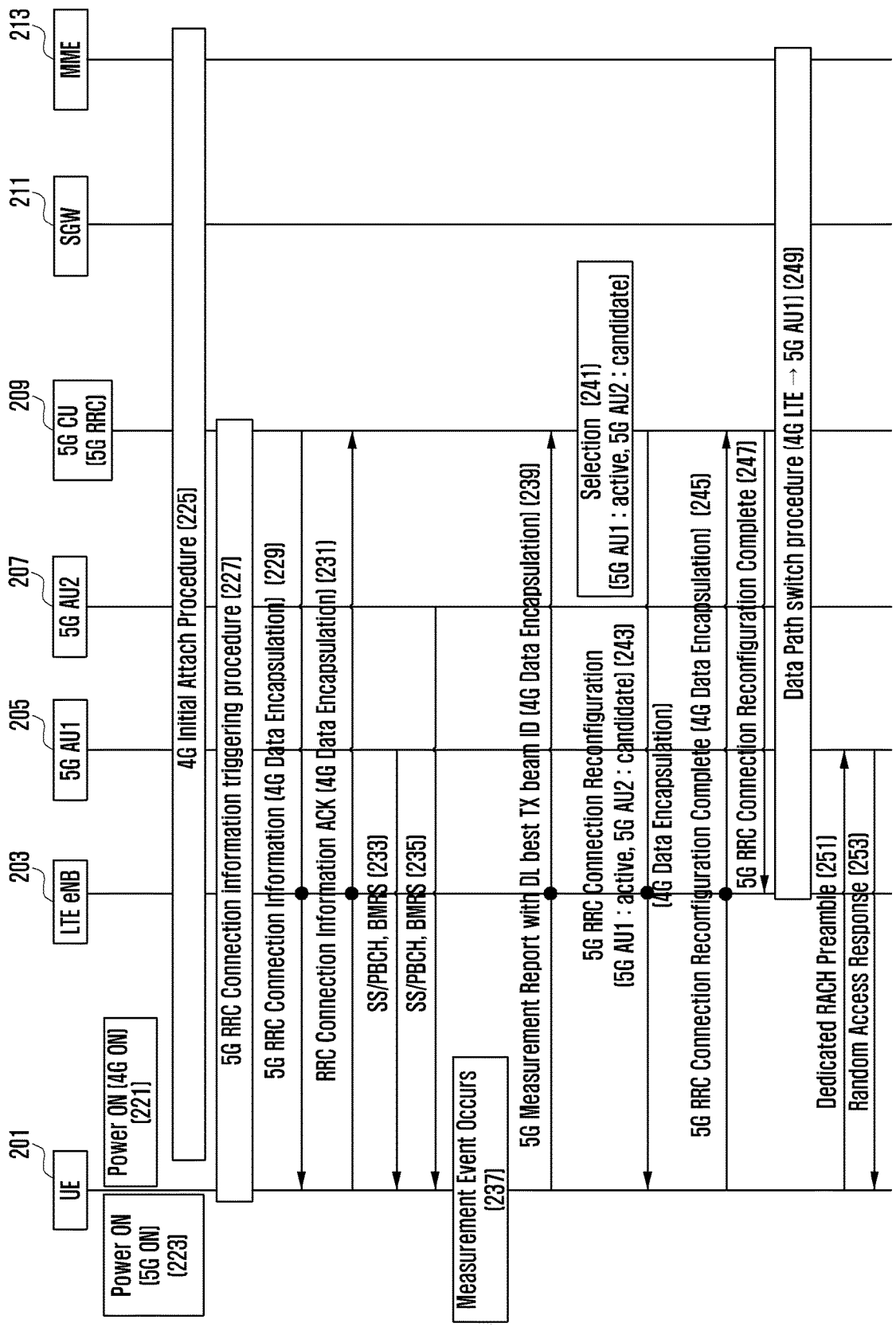
FIG. 2 is a signal flow diagram illustrating an initial access procedure of a UE in a 5G system according to an embodiment of the present invention.

FIG. 2 is a signal flow diagram illustrating a 5G initial access procedure of a terminal in a non-standalone system according to an embodiment of the present invention. In FIG. 2, the user equipment (UE) 201 denotes a terminal, and the LTE eNB 203 denotes an LTE base station. The 5G access unit 1 (AU1) 205 and AU2 207 are network entities having physical (PHY) layer functions and some media access control (MAC) layer functions of a 5G eNB, and the 5G control unit (CU) 209 is an entity having the remaining functions (MAC, radio link control (RLC), packet data convergence protocol (PDCP), and radio resource control (RRC)) with the exception of the functions of the 5G AU. The 5G AU may be defined as a radio unit of the 5G eNB, and the 5G CU may be defined as a control unit of the 5G eNB. The 5G AU and 5G CU may be configured to have functions different from the aforementioned functions, and detailed descriptions on the functions of the 5G AC and 5G CU are omitted herein because those are out of the scope of the present invention. The 5G eNB may be separated into a 5G AU and a 5G CU or implemented as a single entity. In the case that the 5G eNB is separated into two entities, the 5G AU and 5G CU may be connected through an interface. The following description is directed to the case where the 5G eNB is separated into the 5G AU and 5G CU for convenience of explanation. However, the present invention is not limited thereto, and it includes embodiments in which the 5G eNB is a single entity without being separated into two entities.

If the UE 201 powers on, the LTE modem and the 5G modem are activated at steps 221 and 223 and accesses to an LTE system via the LTE eNB 203 according to a legacy procedure at step 225. Among the UEs connected to the LTE system, the UE 201 having a 5G modem may receive a 5G RRC Connection information (configuration information necessary for establishing a 5G RRC connection) as follows at step 227.

1) UE Initiated Triggering Via LTE eNB

The UE 201 with the 5G modem may notify the LTE eNB 203 of its 5G capability using the UE capability information that is transmitted in the LTE initial access procedure. The UE 201 may transmit a UECapabilityInformation message including 5G capability in response to a UECapabilityEnquiry message. The UECapabilityInformation message may include the information indicating whether the UE 201 supports the 5G standalone mode or 5G non-standalone mode. If the 5G capability information of the UE 201 is received, the LTE eNB 203 may transmit to the 5G CU 209 a signal instructing generation of 5G RRC Connection information or the 5G RRC Connection information may be generated autonomously. If the 5G CU 209 or the LTE eNB 203 receives the signal instructing generation of the 5G RRC Connection information, the 5G RRC Connection information may be generated and transmitted to the UE 201 at step 229. The 5G RRC Connection information may include advance information for use by the UE 201 in accessing the 5G AU/CU.

According to an embodiment of the present invention, the 5G RRC Connection information message may include at least one of 5G system information (e.g., whole or part of 5G system information corresponding to LTE master information block (MIB) or system information blocks (SIBs)), 5G cell information (frequency, bandwidth, etc.), and 5G cell measurement configuration information. The 5G RRC Connection information message may include a system frame number (SFN) parameter for use by the 5G eNB. The 5G RRC Connection information may also include the information on one or more 5G AUs 205 and 207 being controlled by the 5G CU 209. The 5G RRC Connection information may also include the information (PHY, MAC, RLC, RRC, and PDCP information) necessary when the UE 201 communicates with the 5G CU 209/5G AUs 205 and 207. For example, the RRC information may include a C-RNTI for use in identifying the UE. In response to the 5G RRC Connection information message, the UE 201 may transmit a 5G RRC Connection information ACK at step 231.

Meanwhile, the UE may search for the 5G AUs 205 and 207 using the 5G RRC Connection information. The 5G RRC Connection information may include 5G AU location information. The 5G AU location information may include at least one of latitude and longitude of the locations of the 5G AUs 205 and 207 and a radius thereof. The UE 201 may compare the corresponding information and its location information to determine whether to turn on/off the 5G modem and search for the 5G eNB. This makes it possible to save power by protecting against any unnecessary 5G cell search and measurement operation. Alternatively, the UE may transmit its location information to the 5G CU 209 periodically in order for the 5G CU 209 to detect the presence of the 5G AUs 205 and 207 around the UE. When the UE 201 is located close to the 5G AU, the 5G CU 209 may transmit the 5G RRC Connection information.

2) UE Initiated Triggering Via 5G CU (RRC)

Among the UEs that have completed initial access to the LTE system, the UE having 5G capability may transmit a 5G RRC Connection information request message to the 5G CU 209 via the LTE eNB 203. If the 5G CU 209 is within the LTE service area, the 5G CU 209 may transmit a 5G RRC Connection information message at step 229 in response to the 5G RRC Connection information request message. Upon receipt of the 5G RRC Connection information message, the UE 201 may transmit a 5G RRC Connection information ACK message at step 231. If no 5G RRC Connection information message is received after transmitting the 5G RRC Connection information request message, the UE 201 may determine that there is no 5G eNB within the current LTE service area. The LTE eNB 203 may transmit to the UE a message indicative of the absence of a 5G eNB.

According to an embodiment of the present invention, the 5G RRC Connection information message may include at least one of 5G system information (e.g., whole or part of 5G system information corresponding to LTE master information block (MIB) or system information block (SIB)), 5G cell information (frequency, bandwidth, etc.), and 5G cell measurement configuration information. The 5G RRC Connection information message may include an SFN parameter for use by the 5G eNB. The 5G RRC Connection information may also include the information on one or more 5G AUs 205 and 207 being controlled by the 5G CU 209. The 5G RRC Connection information may also include the information (PHY, MAC, RLC, RRC, and PDCP information) necessary when the UE 201 communicates with the 5G CU 209/5G AUs 205 and 207. For example, the RRC information may include a C-RNTI for use in identifying the UE. In response to the 5G RRC Connection information message, the UE 201 may transmit a 5G RRC Connection information ACK at step 231.

The UE may search for the 5G AUs 205 and 207 using the 5G RRC Connection information. The 5G RRC Connection information may include 5G AU location information. The 5G AU location information may include at least one of latitude and longitude of the locations of the 5G AUs 205 and 207 and a radius thereof The UE 201 may compare the corresponding information and its location information to determine whether to turn on/off the 5G modem and search for the 5G eNB. This makes it possible to save power by protecting against any unnecessary 5G cell search and measurement operation.

3) LTE eNB Initiated Triggering

The LTE eNB 203 may check for the presence of the 5G CU 209 and the 5G AUs 205 and 207 within its transmission range. If the 5G CU 209 and the 5G AUs 205 and 207 are within the transmission range of the LTE eNB 203, the UE may attempt initial access as follows.

The user information indicative of the 5G capability of the UE may be stored in the core network (e.g., home subscriber server (HSS)) in the form of an LTE system subscriber profile. The user information may be conveyed in an IMEI or AMBR parameter. If the IMEI or AMBR is set to a value indicative of 5G, the MME 213 may transmit to the LTE eNB 203 the information indicating that the UE 201 supports 5G communication. This may be the case, for example, when the AMBR is set to a value greater than that for 4G communication and when the IMEI is set to a 5G-specific value. On the basis of the 5G capability information of the UE that is exchanged between the MME 213 and the LTE eNB 203, it may be possible to establish an S1 or S5 bearer supporting 5G services. For example, the MME 213 may transmit to the LTE eNB 203 the information indicating that the UE 201 supports 5G communication. If the 5G capability information of the UE 201 is received, the LTE eNB 203 may transmit a signal instructing generation of 5G RRC Connection information or the 5G RRC Connection information may be generated autonomously.

If the 5G CU 209 or the LTE eNB 203 receives the signal instructing generation of the 5G RRC Connection information, the 5G RRC Connection information may be generated and transmitted to the UE 201 at step 229. The 5G RRC Connection information may include advance information for use by the UE 201 in accessing the 5G AU/CU.

According to an embodiment of the present invention, the 5G RRC Connection information message may include at least one of 5G system information (e.g., whole or part of 5G system information corresponding to LTE MIB or SIBs), 5G cell information (frequency, bandwidth, etc.), and 5G cell measurement configuration information. The 5G RRC Connection information message may include a system frame number (SFN) parameter for use by the 5G eNB. The 5G RRC Connection information may also include the information on one or more 5G AUs 205 and 207 being controlled by the 5G CU 209. The 5G RRC Connection information may also include the information (PHY, MAC, RLC, RRC, and PDCP information) necessary when the UE 201 communicates with the 5G CU 209/5G AUs 205 and 207. For example, the RRC information may include a C-RNTI for use in identifying the UE. In response to the 5G RRC Connection information message, the UE 201 may transmit a 5G RRC Connection information ACK at step 231. It may also be possible for the UE to search for the 5G AUs 205 and 207 using the 5G RRC Connection information.

Alternatively, the LTE eNB 203 may check for the presence of the 5G CU 209 and the 5G AUs 205 and 207 within its transmission range. If the 5G CU 209 and the 5G AUs 205 and 207 are within the transmission range of the LTE eNB 203 and the UE is attempting initial access, the LTE eNB 203 may transmit to the 5G CU a signal instructing the 5G CU 209 to generate 5G RRC Connection information or transmit the 5G RRC Connection information to the 5G CU 209. The 5G CU 209 or the LTE eNB 203 may generate the 5G RRC Connection information and transmit the 5G RRC Connection information to the UE. If the UE 201 that has received this information has 5G capability, it may transmit a 5G RRC Connection information ACK at step 231. If the UE 201 that has received this information has no 5G capability, the UE 201 may ignore the 5G RRC Connection information.

According to an embodiment of the present invention, the 5G RRC Connection information message may include at least one of 5G system information (e.g., whole or part of 5G system information corresponding to LTE MIB or SIBs), 5G cell information (frequency, bandwidth, etc.) and 5G cell measurement configuration information. The 5G RRC Connection information message may include a system frame number (SFN) parameter for use by the 5G eNB. The 5G RRC Connection information may also include the information on one or more 5G AUs 205 and 207 being controlled by the 5G CU 209. The 5G RRC Connection information may also include the information (PHY, MAC, RLC, RRC, and PDCP information) necessary when the UE 201 communicates with the 5G CU 209/5G AUs 205 and 207. For example, the RRC information may include a C-RNTI for use in identifying the UE. In response to the 5G RRC Connection information message, the UE 201 may transmit a 5G RRC Connection information ACK at step 231.

Meanwhile, the UE may search for the 5G AUs 205 and 207 using the 5G RRC Connection information. The 5G RRC Connection information may include 5G AU location information. The 5G AU location information may include at least one of latitude and longitude of the locations of the 5G AUs 205 and 207 and a radius thereof The UE 201 may compare the corresponding information and its location information to determine whether to turn on/off the 5G modem and search for the 5G eNB. This makes it possible to save power by protecting against any unnecessary 5G cell search and measurement operation.

The 5G RRC Connection information may be acquired before or after the UE 201 turns on the 5G modem. The UE 201 may store the 5G RRC Connection information conveyed in the 5G RRC Connection information message for use in configuring a 5G RRC connection.

The UE 201 may transmit 5G radio capability information (e.g., supportable carrier aggregation configuration, supportable MIMO configuration, and supportable beamforming configuration) to the LTE eNB or the 5G eNB.

The 5G UE 201 may receive a synchronization signal (SS) (or SS/broadcast channel (BCH) signal) to search for the 5G AUs 205 and 207 at steps 233 and 235. If the SS (or SS/BCH signal) is received, the UE achieves downlink synchronization. After achieving synchronization, the UE 201 receives a BMRS to perform 5G AU measurement at step 237.

Alternatively, the UE may achieve synchronization based on the SS and then receive the BMRS immediately to perform measurement.

Alternatively, the UE may achieve synchronization based on the BMRS and perform measurement immediately.

According to an embodiment of the present invention, the SS may include a 5G cell identifier. Alternatively, the BMRS may include a 5G cell identifier.

If it is determined that communication is possible via a specific 5G AU as a result of measurement on the BMRS from the 5G AUs 205 and 207, the UE 201 may transmit a 5G Measurement report to the 5G CU 209 via the LTE eNB 203 at step 239. Alternatively, the UE 201 may transmit the 5G Measurement report to the LTE eNB 203, and the LTE eNB 203 may deliver the 5G Measurement report to the 5G CU 209. According to an embodiment of the present invention, the 5G Measurement report may include at least one of 5G AU ID and BMRS measurement value (RSRP or RSRQ). The 5G Measurement report may include the best downlink beam ID of available 5G AUs.

Upon receipt of the 5G Measurement report, the 5G CU 209 may select at step 241 one 5G AU with the best measurement value or one or more 5G AUs with a measurement value equal to or greater than a predetermined threshold. FIG. 2 exemplifies a case where the 5G AU1 205 and 5G AU2 207 are selected. It may be exemplified that the 5G AU1 205 is a serving (active) cell and the 5G AU2 207 is a candidate cell.

After selecting the 5G AU, the 5G CU 209 may transmit to the UE 201 at step 243 a 5G RRC Connection Reconfiguration message including information necessary for communication with a specific 5G AU. This information may include at least one of UE dedicated information, RNTI, Cell common information, Data Radio Bearer information, Dedicated RACH preamble, and Dedicated RACH resource. The 5G RRC Connection Reconfiguration message may include an SFN parameter for use by the 5G eNB.

After receiving the 5G Connection Reconfiguration message, the UE 201 may transmit a 5G RRC Connection Reconfiguration Complete message to the 5G CU 209 at step 245. Upon receipt of the 5G RRC Connection Reconfiguration Complete message, the 5G CU 209 may transmit the 5G RRC Connection Reconfiguration message to the LTE eNB 203 at step 247. Upon receipt of the 5G RRC Connection Reconfiguration Complete message, the LTE eNB 203 may perform data path switching to the 5G eNB (e.g. 5G AU1 205) at step 249.

If the UE 201 receives the 5G RRC Connection Reconfiguration message, it may transmit, at step 251, to the 5G AU1 205 a dedicated RACH preamble conveyed in the 5G RRC Connection Reconfiguration message. Here, the UE 201 may transmit a dedicated RACH preamble on the beam selected as the best reception beam, as a result of measurement on BMRS of the corresponding AU 205, in two ways as follows.

1) Transmitting Measurement Report with Best Downlink Beam ID

For example, the UE 201 may transmit a dedicated RACH preamble on the beam selected as the best reception beam once as a result of measurement on the BMRS of the corresponding AU 205. Suppose that the UE 201 selects beam 7 as the best downlink transmission beam and beam 3 as the best uplink transmission beam as a result of measurement on BMRS of the corresponding AU 205, then the UE 201 may transmit a measurement report including the best downlink transmission beam ID 7. The 5G AU 205 becomes aware that the best transmission beam for the UE 201 is beam 7 and then receives the RACH preamble once on the beam 7 based on channel reciprocity. Since the best reception beam is beam 3, the UE 201 may transmit the dedicated RACH preamble once on beam 3 based on channel reciprocity.

2) Transmitting Measurement Report without Best Downlink Beam ID

The UE 201 may transmit a dedicated RACH preamble N times on the best reception beam 3, and the 5G AU1 205 may receive the dedicated RACH preamble using beam sweeping. Here, N denotes a number of beams of the 5G eNB. If the 5G AU1 205 becomes aware of the best beam for the RACH, it may also determine the best downlink beam using channel reciprocity.

Upon receipt of the dedicated RACH preamble, the 5G AU1 205 may check for the uplink timing of the UE and notify the UE of the uplink timing by transmitting a Random Access Response message at step 253. The Random Access Response message may include an SFN parameter for use by the 5G eNB.

According to an embodiment of the present invention, a contention-based RACH preamble may be used instead of the dedicated RACH preamble. In this case, the UE may transmit an RACH preamble randomly selected from an RACH preamble set. If collision occurs, it may be possible to reattempt RACH preamble transmission through a backoff procedure. If access fails with a dedicated RACH preamble, the UE 201 may transmit a contention-based RACH preamble.

If a Random Access Response is received successfully from the 5G AU1 205 in response to the contention-based RACH, the UE 201 may notify the 5G CU 209 of the successful RACH procedure via the LTE eNB 203.

The above-described initial access procedure may be applicable to a scenario where both the LTE modem and 5G modem are turned on when the terminal powers on.

It may also be possible to consider a scenario of performing the initial access procedure using a condition for the UE to turn on the 5G modem.

The scenarios for a UE to turn on the 5G modem based on a predetermined condition to perform the 5G initial access procedure in a non-standalone system may be categorized into two scenarios. The first scenario is to perform an application-based 5G initial access procedure, and the second scenario is to perform an LTE eNB buffer status-based 5G initial access procedure.

FIG. 3A is a signal flow diagram illustrating an application-based 5G initial access procedure of a UE in a non-standalone system according to an embodiment of the present invention. In FIG. 3A, the UE 301 denotes a terminal, and the LTE eNB 303 denotes an LTE base station. The 5G AU1 305 and 5G AU2 307 are network entities having PHY layer functions and MAC layer functions (e.g., HARQ) of a 5G eNB, and the 5G CU 309 is a network entity having the remaining functions (MAC, RLC, PDCP, and RRC) with the exception of the functions of the 5G AU. The 5G AUs 305 and 307 and the 5G CU may be configured to have functions different form the aforementioned functions, and detailed descriptions on the functions of the 5G ACs 305 and 307 and the 5G CU 309 are omitted herein because those are out of the scope of the present invention. The 5G eNB may be separated into a 5G AU and a 5G CU or implemented as a single entity. In the case that the 5G eNB is separated into two entities, the 5G AU and 5G CU may be connected through an interface. The following description is directed to the case where the 5G eNB is separated into the 5G AU and 5G CU for convenience of explanation. However, the present invention is not limited thereto, and it includes embodiments in which the 5G eNB is a single entity without being separated into two entities.

If the UE 301 powers on at step 321, the LTE modem is activated at step 323 to access to an LTE system via the LTE eNB 303 at step 325 according to a legacy procedure. Among the UEs connected to the LTE system, the UE 301 having a 5G modem may receive a 5G RRC Connection information (configuration information necessary for establishing a 5G RRC connection) at step 325 as follows.

1) UE Initiated Triggering Via LTE eNB

The UE 301 with the 5G modem may notify the LTE eNB 303 of its 5G capability using the UE capability information that is transmitted in the LTE initial access procedure. The UE 301 may transmit a UECapabilityInformation message including 5G capability in response to a UECapabilityEnquiry message. The UECapabilityInformation message may include the information indicating whether the UE 301 supports the 5G standalone mode or 5G non-standalone mode. If the 5G capability information of the UE 301 is received, the LTE eNB 303 may transmit to the 5G CU 309 a signal instructing generation of 5G RRC Connection information or the 5G RRC Connection information may be generated autonomously. If the 5G CU 309 or the LTE eNB 303 receives the signal instructing generation of the 5G RRC Connection information, the 5G RRC Connection information may be generated and transmitted to the UE 201 at step 327. The 5G RRC Connection information may include advance information for use by the UE 301 in accessing the 5G AU/CU.

According to an embodiment of the present invention, the 5G RRC Connection information message may include at least one of 5G system information (e.g., whole or part of 5G system information corresponding to LTE MIB or SIBs), 5G cell information (frequency, bandwidth, etc.), and 5G cell measurement configuration information. The 5G RRC Connection information message may include an SFN parameter for use by the 5G eNB. The 5G RRC Connection information may also include the information on one or more 5G AUs 305 and 307 being controlled by the 5G CU 309. The 5G RRC Connection information may also include the information (PHY, MAC, RLC, RRC, and PDCP information) necessary when the UE 301 communicates with the 5G CU 309/5G AUs 305 and 307. For example, the RRC information may include a C-RNTI for use in identifying the UE. In response to the 5G RRC Connection information message, the UE 301 may transmit a 5G RRC Connection information ACK at step 329.

Meanwhile, the UE may search for the 5G AUs 305 and 307 using the 5G RRC Connection information. The 5G RRC Connection information may include 5G AU location information. The 5G AU location information may include at least one of latitude and longitude of the locations of the 5G AUs 305 and 307 and a radius thereof. The UE 301 may compare the corresponding information and its location information to determine whether to turn on/off the 5G modem and search for the 5G eNB. This makes it possible to save power by protecting against any unnecessary 5G cell search and measurement operation. Alternatively, the UE may transmit its location information to the 5G CU 309 periodically in order for the 5G CU 309 to detect the presence of the 5G AUs 305 and 307 around the UE. When the UE 301 is located close to the 5G AU, the 5G CU 309 may transmit the 5G RRC Connection information.

2) UE Initiated Triggering Via 5G CU (RRC)

Among the UEs that have completed initial access to the LTE system, the UE having the 5G capability may transmit a 5G RRC Connection information request message to the 5G CU 309 via the LTE eNB 303. If the 5G CU 309 is within the LTE service area, the 5G CU 309 may transmit a 5G RRC Connection information message at step 327 in response to the 5G RRC Connection information request message. Upon receipt of the 5G RRC Connection information message, the UE 301 may transmit a 5G RRC Connection information ACK message at step 329. If no 5G RRC Connection information message is received after transmitting the 5G RRC Connection information request message, the UE 301 may determine that there is no 5G eNB within the current LTE service area. The LTE eNB 303 may transmit to the UE a message indicative of the absence of a 5G eNB.

The 5G RRC Connection information may include advance information for use by the UE 301 in accessing the 5G AU/CU. According to an embodiment of the present invention, the 5G RRC Connection information message may include at least one of 5G system information (e.g., whole or part of 5G system information corresponding to LTE MIB or SIBs), 5G cell information (frequency, bandwidth, etc.), and 5G cell measurement configuration information. The 5G RRC Connection information message may include an SFN parameter for use by the 5G eNB. The 5G RRC Connection information may also include the information on one or more 5G AUs 305 and 307 being controlled by the 5G CU 309. The 5G RRC Connection information may also include the information (PHY, MAC, RLC, RRC, and PDCP information) necessary when the UE 301 communicates with the 5G CU 309/5G AUs 305 and 307. For example, the RRC information may include a C-RNTI for use in identifying the UE. In response to the 5G RRC Connection information message, the UE 301 may transmit a 5G RRC Connection information ACK at step 329.

It may also be possible for the UE to search for the 5G AUs 305 and 307 using the 5G RRC Connection information. The 5G RRC Connection information may include 5G AU location information. The 5G AU location information may include at least one of latitude and longitude of the location of the 5G AUs 305 and 307 and a radius. The UE 301 may compare the corresponding information and its location information to determine whether to turn on/off the 5G modem and search for the 5G eNB. This makes it possible to save power by protecting against any unnecessary 5G cell search and measurement operation.

3) LTE eNB Initiated Triggering

The LTE eNB 303 may check for the presence of the 5G CU 309 and the 5G AUs 305 and 307 within its transmission range. If the 5G CU 309 and the 5G AUs 305 and 307 are within the transmission range of the LTE eNB 303, the UE may attempt initial access as follows.

The user information indicative of the 5G capability of the UE may be stored in the core network (e.g., HSS) in the form of an LTE system subscriber profile. The user information may be conveyed in an IMEI or AMBR parameter. If the IMEI or AMBR is set to a value indicative of 5G, the MME 313 may transmit to the LTE eNB 303 the information indicating that the UE 301 supports 5G communication. This may be the case, for example, when the AMBR is set to a value greater than that for 4G communication and when the IMEI is set to a 5G-specific value. On the basis of the 5G capability information of the UE that is exchanged between the MME 313 and the LTE eNB 303, it may be possible to establish an S1 or S5 bearer supporting 5G services. For example, the MME 313 may transmit to the LTE eNB 303 the information indicating that the UE 301 supports 5G communication. If the 5G capability information of the UE 301 is received, the LTE eNB 303 may transmit a signal instructing generation of 5G RRC Connection information or the 5G RRC Connection information may be generated autonomously.

If the 5G CU 309 or the LTE eNB 303 receives the signal instructing generation of the 5G RRC Connection information, the 5G RRC Connection information may be generated and transmitted to the UE 301 at step 327. The 5G RRC Connection information may include advance information for use by the UE 301 in accessing the 5G AU/CU.

According to an embodiment of the present invention, the 5G RRC Connection information message may include at least one of 5G system information (e.g., whole or part of 5G system information corresponding to LTE MIB or SIBs), 5G cell information (frequency, bandwidth, etc.) and 5G cell measurement configuration information. The 5G RRC Connection information message may include an SFN parameter for use by the 5G eNB. The 5G RRC Connection information may also include the information on one or more 5G AUs 305 and 307 being controlled by the 5G CU 309. The 5G RRC Connection information may also include the information (PHY, MAC, RLC, RRC, and PDCP information) necessary when the UE 301 communicates with the 5G CU 309/5G AUs 305 and 307. For example, the RRC information may include a C-RNTI for use in identifying the UE. In response to the 5G RRC Connection information message, the UE 301 may transmit a 5G RRC Connection information ACK at step 329. It may also be possible for the UE to search for the 5G AUs 305 and 307 using the 5G RRC Connection information.

Alternatively, the LTE eNB 303 may check for the presence of the 5G CU 309 and the 5G AUs 305 and 307 within its transmission range. If the 5G CU 309 and the 5G AUs 305 and 307 are within the transmission range of the LTE eNB 303 and if the UE is attempting initial access, the LTE eNB 303 may transmit to the 5G CU a signal instructing the 5G CU 309 to generate 5G RRC Connection information or transmit the 5G RRC Connection information to the 5G CU 309. The 5G CU 309 or the LTE eNB 303 may generate the 5G RRC Connection information and transmit the 5G RRC Connection information to the UE at step 327. If the UE 301 that has received this information has 5G capability, it may transmit a 5G RRC Connection information ACK at step 329. If the UE 301 that has received this information has no 5G capability, the UE 301 may ignore the 5G RRC Connection information.

The 5G RRC Connection information may include advance information for use by the UE 301 in accessing the 5G AUs 305 and 307. According to an embodiment of the present invention, the 5G RRC Connection information message may include at least one of 5G system information (e.g., whole or part of 5G system information corresponding to LTE MIB or SIBs), 5G cell information (frequency, bandwidth, etc.), and 5G cell measurement configuration information. The 5G RRC Connection information message may include an SFN parameter for use by the 5G eNB. The 5G RRC Connection information may also include the information on one or more 5G AUs 305 and 307 being controlled by the 5G CU 309. The 5G RRC Connection information may also include the information (PHY, MAC, RLC, RRC, and PDCP information) necessary when the UE 301 communicates with the 5G CU 309/5G AUs 305 and 307. For example, the RRC information may include a C-RNTI for use in identifying the UE. In response to the 5G RRC Connection information message, the UE 301 may transmit a 5G RRC Connection information ACK at step 329.

Meanwhile, the UE may search for the 5G AUs 305 and 307 using the 5G RRC Connection information. The 5G RRC Connection information may include 5G AU location information. The 5G AU location information may include at least one of latitude and longitude of the locations of the 5G AUs 305 and 307 and a radius thereof. The UE 301 may compare the corresponding information and its location information to determine whether to turn on/off the 5G modem and search for the 5G eNB. This makes it possible to save power by protecting against any unnecessary 5G cell search and measurement operation.

The UE 301 may transmit 5G radio capability information (e.g., supportable carrier aggregation configuration, supportable MIMO configuration, and supportable beamforming configuration) to the LTE eNB or the 5G eNB.

If a 5G application is executed at step 331, the 5G UE 301 may turn on the 5G modem to perform the initial access procedure to the 5G eNB using the 5G RRC Connection information. It may be possible that the 5G application information is sent to the 5G modem of the UE 301 through the application layer. Step 331 is described in detail later with reference to FIGS. 9 and 10. According to an embodiment of the present invention, the UE 301 may have a pre-configured 5G application list or receive the 5G application list through the LTE system.

As the 5G modem of the UE 301 is turned on but does not have a 5G connection yet, the UE 301 may receive data through the LTE connection at step 333. At this time, the UE 301 may receive a signal through a default bearer established in the initial access procedure or set up a dedicated bearer to receive 5G data.

After turning on the 5G modem, the 5G UE 301 may receive SS/BCH from the 5G AUs 305 and 307 at steps 335 and 337 to achieve downlink synchronization. After achieving synchronization, the UE 301 may receive a BMRS to perform 5G AU measurement at step 339. Alternatively, the UE 301 may perform the measurement immediately after achieving synchronization based on the BMRS. According to an embodiment of the present invention, the SS may include a 5G cell identifier. Alternatively, the BMRS may include the 5G cell identifier.

If it is determined that communication is possible via a specific 5G AU as a result of measurement on the BMRS from the 5G AUs 305 and 307, the UE 301 may transmit a 5G Measurement report to the 5G CU 309 via the LTE eNB 303 at step 341. Alternatively, the UE 201 may transmit the 5G Measurement report to the LTE eNB 303, and the LTE eNB 303 may deliver the 5G Measurement report to the 5G CU 309. According to an embodiment of the present invention, the 5G Measurement report may include at least one of 5G AU ID and BMRS measurement value (RSRP or RSRQ). The 5G Measurement report may include the best downlink beam ID of available 5G AUs.

Upon receipt of the 5G Measurement report, the 5G CU 309 may, at step 343, select one 5G AU with the best measurement value or one or more 5G AUs with a measurement value equal to or greater than a predetermined threshold. FIG. 3A exemplifies a case where the 5G AU1 305 and 5G AU2 307 are selected. It may be exemplified that the 5G AU1 305 is a serving (active) cell and the 5G AU2 307 is a candidate cell.

After selecting the 5G AU, the 5G CU 309 may transmit to the UE 301 at step 345 a 5G RRC Connection Reconfiguration message including information necessary for communication with a specific 5G AU. This information may include at least one of UE dedicated information, RNTI, Cell common information, Data Radio Bearer information, Dedicated RACH preamble, and Dedicated RACH resource. The 5G RRC Connection Reconfiguration message may include an SFN parameter for use by the 5G eNB.

After receiving the 5G Connection Reconfiguration message, the UE 301 may transmit a 5G RRC Connection Reconfiguration Complete message to the 5G CU 309 at step 347. Upon receipt of the 5G RRC Connection Reconfiguration Complete message, the 5G CU 309 may transmit the 5G RRC Connection Reconfiguration message to the LTE eNB 303 at step 349. Upon receipt of the 5G RRC Connection Reconfiguration Complete message, the LTE eNB 303 may transmit UE data accumulated in the buffer until then to the 5G AU1 305 at step 351 and perform data path switching to the 5G eNB (e.g. 5G AU1 305) at step 357.

Meanwhile, if the UE 301 receives the 5G RRC Connection Reconfiguration message, it may transmit, at step 353, to the 5G AU1 305 a dedicated RACH preamble conveyed in the 5G RRC Connection Reconfiguration message. Here, the UE 301 may transmit a dedicated RACH preamble on the beam selected as the best reception beam, as a result of measurement on BMRS of the corresponding AU 305, in two ways as follows.

1) Transmitting Measurement Report with Best Downlink Beam ID

For example, the UE 301 may transmit a dedicated RACH preamble on the beam selected as the best reception beam once as a result of measurement on the BMRS of the corresponding AU 305. Suppose that the UE 301 selects beam 7 as the best downlink transmission beam and beam 3 as the best uplink transmission beam as a result of measurement on BMRS of the corresponding AU 305, then the UE 301 may transmit a measurement report including the best downlink transmission beam ID 7. The 5G AU 305 becomes aware that the best transmission beam for the UE 301 is beam 7 and then receives the RACH preamble once on the beam 7 based on channel reciprocity. Since the best reception beam is beam 3, the UE 301 may transmit the dedicated RACH preamble once on beam 3 based on channel reciprocity.

2) Transmitting Measurement Report without Best Downlink Beam ID

The UE 301 may transmit a dedicated RACH preamble N times on the best reception beam 3, and the 5G AU1 305 may receive the dedicated RACH preamble using beam sweeping. Here, N denotes a number of beams of the 5G eNB. If the 5G AU1 305 becomes aware of the best beam for the RACH, it may also determine the best downlink beam using channel reciprocity.

Upon receipt of the dedicated RACH preamble, the 5G AU1 305 may check for the uplink timing of the UE and notify the UE of the uplink timing by transmitting a Random Access Response message at step 355. The Random Access Response message may include an SFN parameter for use by the 5G eNB.

According to an embodiment of the present invention, a contention-based RACH preamble may be used instead of the dedicated RACH preamble. In this case, the UE may transmit an RACH preamble randomly selected from an RACH preamble set. If collision occurs, it may be possible to reattempt RACH preamble transmission through a back-off procedure. If access fails with a dedicated RACH preamble, the UE 301 may transmit a contention-based RACH preamble.

If a Random Access Response is received successfully from the 5G AU1 305 in response to the contention-based RACH, the UE 301 may notify the 5G CU 309 of the successful RACH procedure via the LTE eNB 303.

Figure 3B:
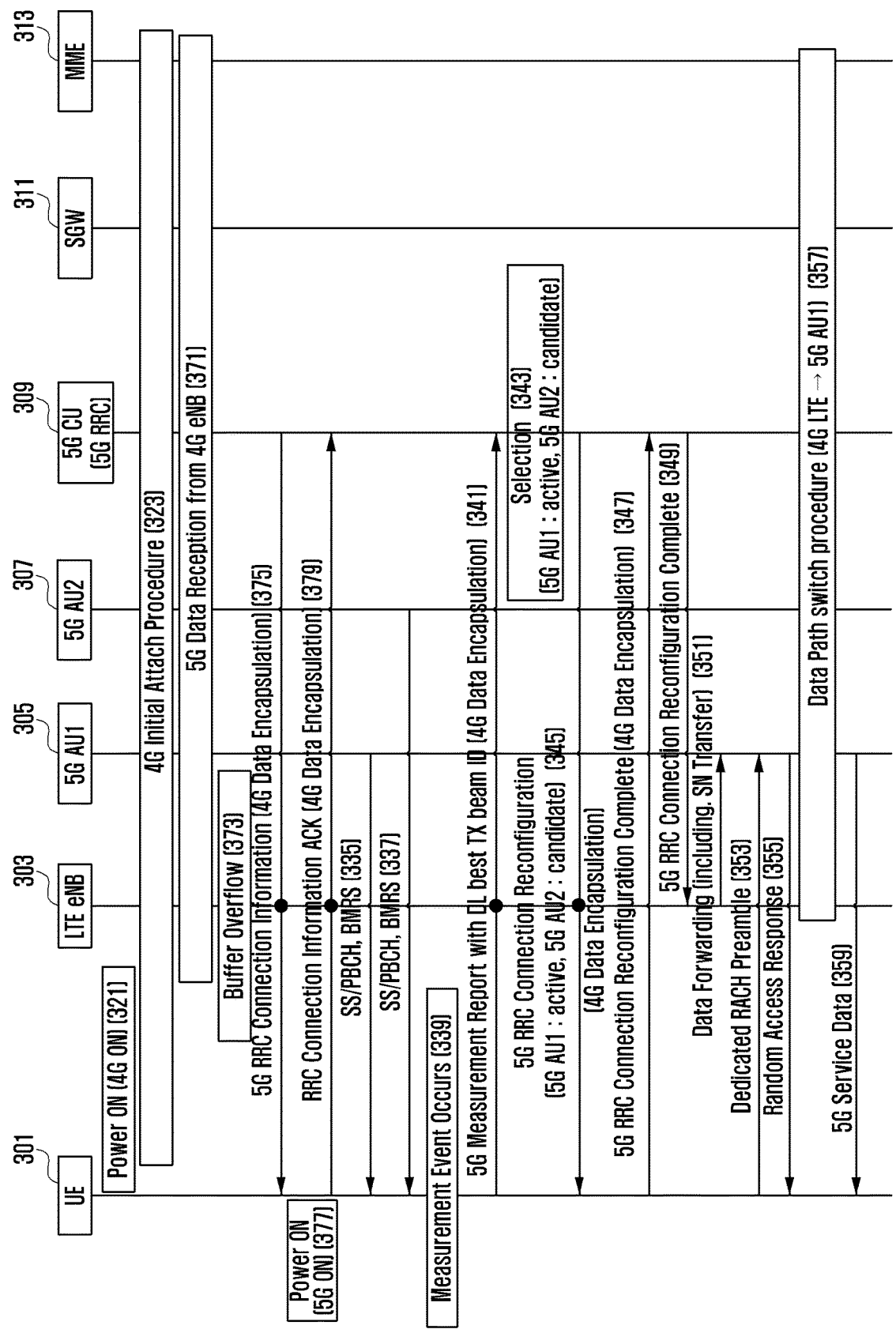
FIG. 3B is a signal flow diagram illustrating an initial access procedure of a UE in a 5G system according to another embodiment of the present invention.

FIG. 3B is a signal flow diagram illustrating an LTE eNB buffer status-based 5G initial access procedure of a UE in a non-standalone system according to an embodiment of the present invention. In FIG. 3B, the UE 301 denotes a terminal, and the LTE eNB 303 denotes an LTE base station. The 5G AU1 305 and 5G AU2 307 are network entities having PHY layer functions and MAC layer functions (e.g., HARQ) of a 5G eNB, and the 5G CU 309 is a network entity having the remaining functions (MAC, RLC, PDCP, and RRC) with the exception of the functions of the 5G AU. The 5G eNB may be separated into a 5G AU and a 5G CU or implemented as a single entity. In the case that the 5G eNB is separated into two entities, the 5G AU and 5G CU may be connected through an interface. The following description is directed to the case where the 5G eNB is separated into the 5G AU and 5G CU for convenience of explanation. However, the present invention is not limited thereto, and it includes embodiments in which the 5G eNB is a single entity without being separated into two entities.

The procedure of FIG. 3B is similar to that of FIG. 3A, but it has differences as follows. If a 5G application is executed in the UE, the UE 301 may receive data via the LTE eNB 303 at step 371. If a large volume of 5G data arrives at the LTE eNB 303 and it is detected at step 373 that the data amount buffered in the LTE eNB buffer has become greater than a predetermined threshold because of the transmission limit of the LTE eNB 303, the LTE eNB 303 may transmit to the 5G CU 309 a signal instructing generation of 5G RRC Connection information. In this case, the 5G CU 309 may generate and transmit the 5G RRC Connection information at step 375, or the LTE eNB 303 may autonomously generate and transmit the 5G RRC Connection information.

The 5G RRC Connection information may include advance information for use by the UE 301 in accessing the 5G AU/CU. The 5G RRC Connection information message may include at least one of 5G system information (e.g., whole or part of 5G system information corresponding to LTE MIB or SIBs), 5G cell information (frequency, bandwidth, etc.), and 5G cell measurement configuration information. The 5G RRC Connection information message may include an SFN parameter for use by the 5G eNB. The 5G RRC Connection information may also include the information on one or more 5G AUs 305 and 307 being controlled by the 5G CU 309. The 5G RRC Connection information may also include the information (PHY, MAC, RLC, RRC, and PDCP information) necessary when the UE 301 communicates with the 5G CU 209/5G AUs 305 and 307. For example, the RRC information may include a C-RNTI for use in identifying the UE.

In response to the 5G RRC Connection information message, the UE 301 may transmit a 5G RRC Connection information ACK at step 379. The UE 301 may transmit 5G radio capability information (e.g., supportable carrier aggregation configuration, supportable MIMO configuration, and supportable beamforming configuration) to the LTE eNB or the 5G eNB. The operations of the subsequent steps may be performed in the same way as those of the procedure of FIG. 3A.

If the 5G eNB capacity is saturated so as not to serve the UE 301, the eNB has to bar UE access to the eNB. The UE access barring notification information may be conveyed in at least one of the 5G RRC Connection information message, the 5G RRC Connection Reconfiguration message, and the Random Access Response message. The UE access barring notification information may include at least one of a UE access baring indicator, an accessible UE class/type, and an access-retry available timing of the access-barred UE. If the UE 301 receives the UE access barring notification information through the 5G RRC Connection information message, the 5G RRC Connection Reconfiguration message, and the Random Access Response message, it may stop the procedure of accessing the 5G eNB. If the UE access barring notification information includes the access-retry available timing of the access-barred UE, the UE may perform the 5G access procedure to the same 5G eNB at the access-retry available timing. It may also be possible for the UE 301 to try 5G access to another 5G eNB rather than the access-barred 5G eNB. In order to generate the UE access barring notification information, it may be necessary to exchange information between the LTE eNB and the 5G eNB.

Figure 4:
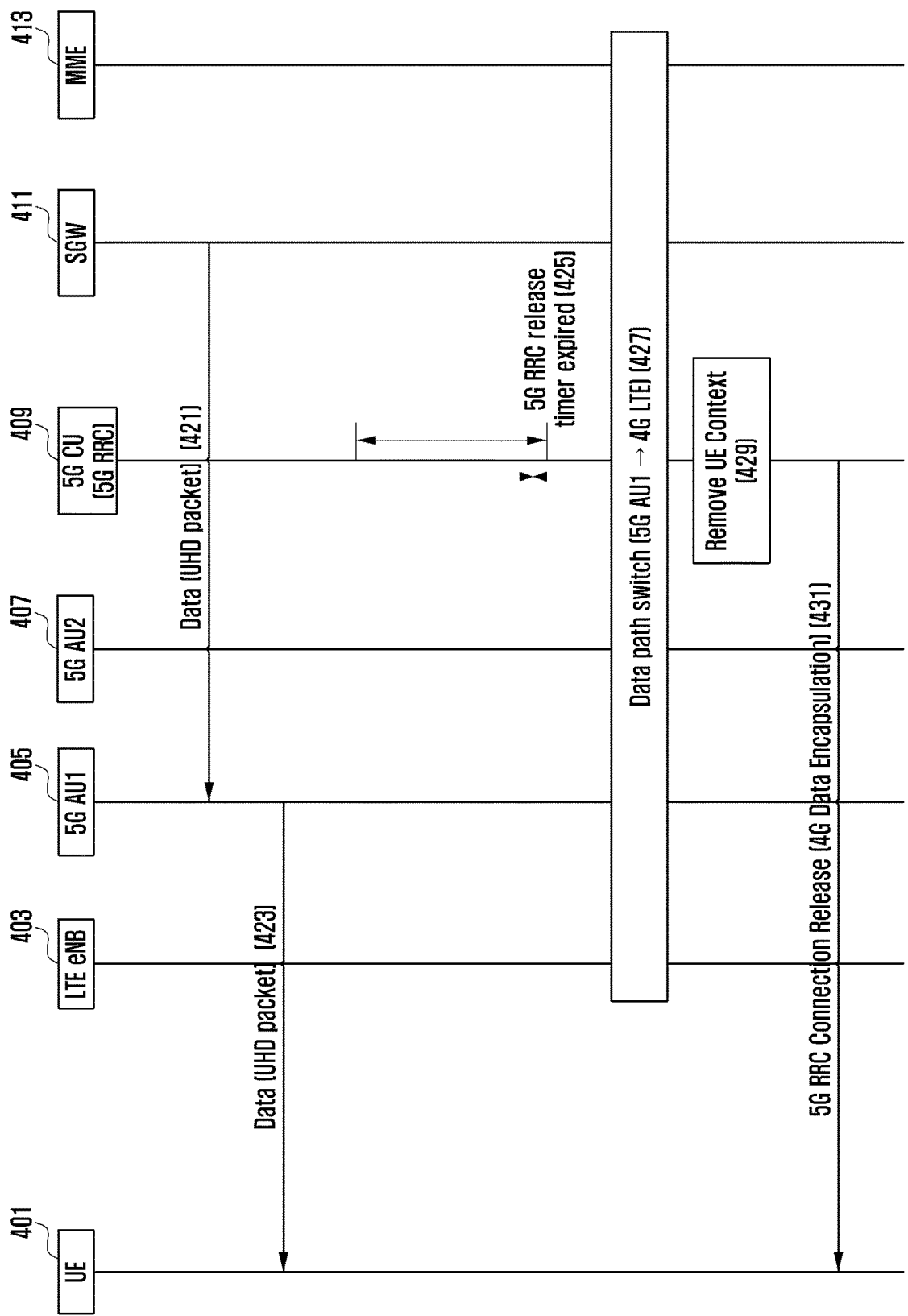
FIG. 4 is a signal flow diagram illustrating a connection release procedure of a UE in a 5G system according to an embodiment of the present invention.

FIG. 4 is a signal flow diagram illustrating signal flows in a procedure of terminating 5G connection in a non-standalone system according to an embodiment of the present invention. In reference to FIG. 4, the UE 401 may receive 5G service data packets through 5G eNB/S-GW/P-GW at steps 421 and 423. The service data packet transmission may be performed using a beam selected in a beamforming procedure between the UE and the 5G eNB (e.g., 5G AU1 405). In the course of transmitting a signal including the service data packet, the 5G eNB (e.g., 5G CU 409) may determine at step 425 whether a 5G RRC release timer has expired. If the 5G RRC release timer expires, the 5G eNB (5G CU 409) may switch the data path for the UE 401 from the 5G AU1 405 to the LTE eNB 403 at step 427. Then, the eNB (5G CU 409) may release the radio context for the UE 401, e.g., RNTI, 5G cell measurement configuration information, and DRX mode configuration information, at step 429. The eNB (5G CU 409) may transmit a 5G RRC Connection Release message to the UE 401 at step 431. After releasing the 5G RRC Connection, the UE 401 may turn off the 5G modem or perform a cell search procedure for searching for a 5G AU. It is obvious that the UE 401 may receive the service via the LTE system after turning off the 5G modem.

As an alternative example of releasing system connection of the UE, the eNB (5G CU 409) may check the buffer status of the UE 401 to determine that no 5G radio (5G system) is necessary for serving the UE 401. The eNB (5G CU) 409 may perform the 5G RRC connection release procedure with the S-GW 411, P-GW (not shown), and MME 413 and transmit a 5G RRC Connection Release message to the UE 401. If the 5G RRC Connection Release message is received, the UE 401 may release the RRC context with the 5G cell (eNB (5G CU 409)). The UE 401 may transmit a response to the eNB (5G CU 409) in response to the 5G RRC Connection Release message. Upon receipt of the response, the eNB (5G CU 409) may release the 5G context (5G radio context) for the UE 401. After releasing the 5G RRC Connection, the UE 401 may turn off the 5G modem or perform a cell search procedure to search for a 5G AU. It is obvious that the UE 401 may receive the service via the LTE system after turning off the 5G modem if it supports the LTE system.

As another alternative example of releasing system connection of the UE, the UE 401 may transmit an RRC Connection Release Request message to the eNB (5G CU 409), and the eNB (5G CU 409) may transmit an RRC Connection Release Confirm message in reply. The UE 401 may operate an RRC context release timer to transmit the RRC Connection Release Request message. If the 5G communication service application is deactivated, the application processor (AP) of the UE 401 may generate a command instructing release of the RRC connection to its 5G modem, which may transmit the RRC Connection Release Request message. If the UE has the 5G eNB location information, it may compare its location and the 5G eNB location and, if the UE is not located within the service area of the 5G eNB any more, transmit an RRC Connection Release Request message by means of the 5G modem. If the RRC Connection Release Request message is received from the UE 401, the eNB (5G CU 409) may perform a 5G RRC Connection release procedure with the S-GW 411, P-GW (not shown), and MME 413 and transmit a 5G RRC Connection Release message to the UE 401. If the 5G RRC Connection Release message is received, the UE 401 may release the RRC Context with the 5G cell (eNB (5G CU 409)). The eNB (5G CU 409) may release the 5G context (5G radio context) for the UE 401. After releasing the 5G RRC Connection, the UE 401 may turn off the 5G modem or perform a cell search procedure to search for a 5G AU.

Figure 5:
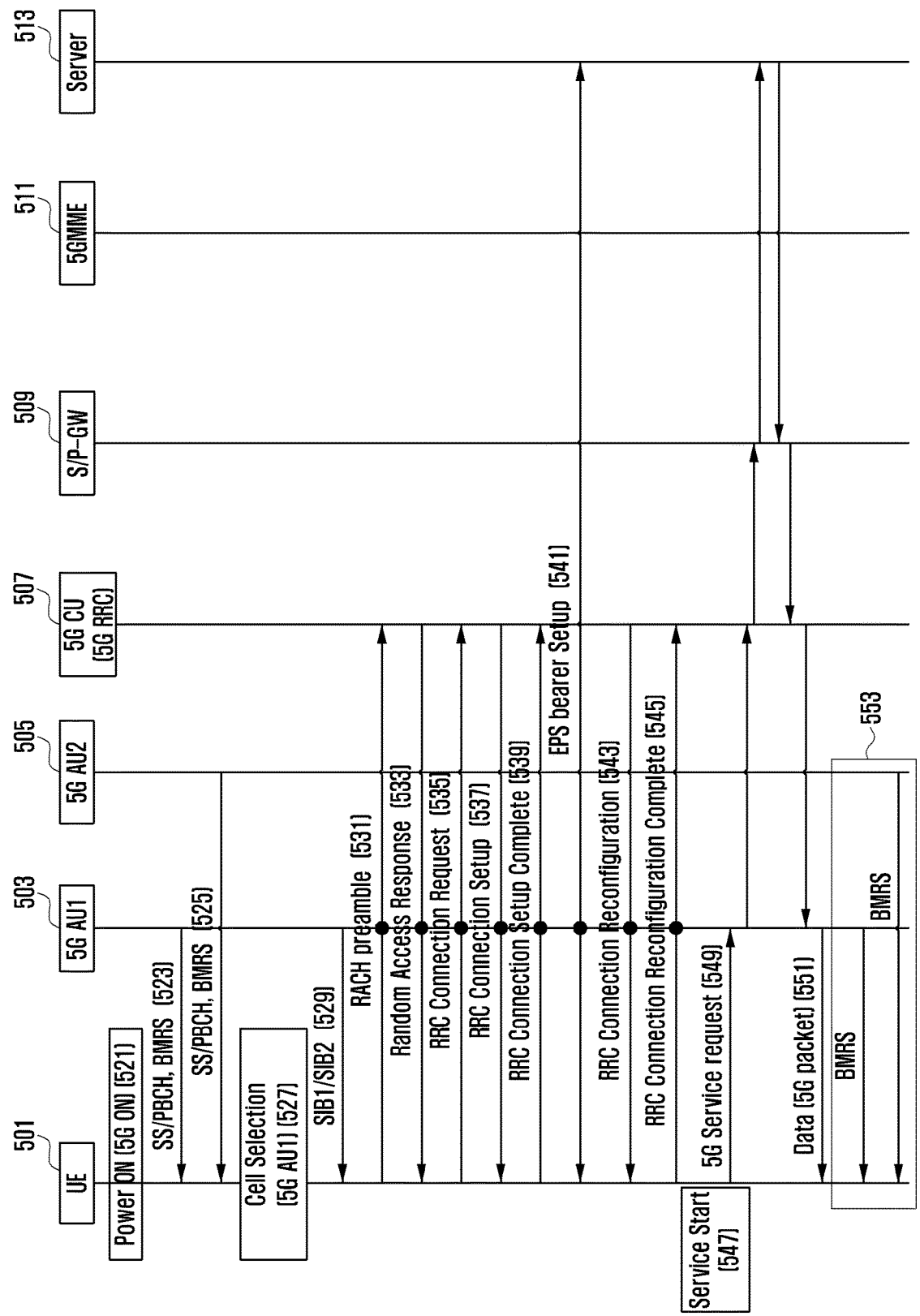
FIG. 5 is a signal flow diagram illustrating an initial access procedure of a UE in a 5G system according to another embodiment of the present invention.

FIG. 5 is a signal flow diagram illustrating signal flows between a UE and a system during a system access procedure in a standalone scenario of a new system (e.g., 5G system) according to an embodiment of the present invention.

Here, examples of the legacy system include the LTE system and LTE-Advanced system, and examples of the new system include the 5G system.

If the UE 501 powers on, the 5G modem turns on, and the UE operations to be described hereinafter may be implemented by the 5G modem. The UE 501 may search for a 5G cell and perform a procedure of accessing the system through the 5G cell. If the system access procedure is completed, the UE 501 may receive the communication service through the system. The base station apparatus that manages the 5G cell may include a radio unit (e.g., 5G AU1 503 and 5G AU2 505) and a control unit (5G CU 507), which may be implemented as separate devices or as a single device. In the case that the radio unit and the control unit are implemented as separate devices, they may exchange signals through an interface. In FIG. 5, the radio unit and the control unit are depicted as separate devices. It may not be necessary to differentiate between the radio unit and the control unit of the base station and, in the following description, the radio unit and the control unit are referred to as base station collectively.

A description is made of the procedure for a UE 501 to search for a 5G cell and access the system through the 5G cell with reference to FIG. 5. Alternatively, in the case where the UE 501 has found both the 4G and 5G cells, it may be possible to allow the UE 501 to refer to a cell selection priority (or cell reselection priority) as a metric for selecting a cell to perform a system access procedure, by assigning different cell selection priorities to 4G and 5G cells. The priorities of the 4G and 5G cells may be set according to the subscribed service of the UE and management policy of the network operator.

In reference to FIG. 5, if the UE 501 powers on at step 521, it may receive synchronization reference signals (SS) from the 5G AU1 503 and the 5G AU2 505 at steps 523 and 525. The UE 501 may search for 5G cells based on the SS and select a base station (i.e., 5G cell) at step 527 to perform the system access procedure. The UE 501 may achieve time and frequency synchronization with the base station based on the SS. The UE 501 may further receive a system information signal (PBCH) and beam measurement reference signal (BMRS) transmitted by the base station (5G AU1 503 and 5G AU2 505). According to an embodiment of the present invention, the SS may include a 5G cell identifier. Alternatively, the BMRS may include the 5G cell identifier.

The PBCH may include system information (e.g., BMRS configuration, period, transmission position, and transmission resource) for receiving BMRS. The PBCH may also include basic system information (e.g., system frame number, downlink channel configuration, and HARQ configuration) necessary to access the system via the base station in addition to the system information related to the BMRS. The UE 501 may acquire a downlink beam based on the BMRS. For example, the UE may perform measurement on the BMRS to select the best downlink beam.

The UE may receive other system information (SIB1, SIB2, etc.) transmitted by the base station (5G AU1 503 and 5G AU2 505) at step 529. The other system information may include the information necessary for performing an RACH procedure to the base station (e.g., RACH preamble, RACH resource position, and RACH resource period).

The UE 501 may perform the RACH procedure with the base station based on the RACH information. The RACH procedure may be initiated by transmitting an RACH preamble at step 531. The UE 501 may transmit the RACH preamble including the previously acquired best downlink beam information to the base station. At step 533, the UE 501 may receive a Random Access Response from the base station in response to the RACH preamble. The UE 501 may acquire uplink resource information necessary for transmitting timing advance (TA) information and an RRC Connection Request message to the base station.

The UE 501 may transmit an RRC Connection Request message to the base station at step 535 and receive an RRC Connection Setup message from the base station at step 537 in response to RRC Connection Request message. The UE 501 may transmit 5G radio capability information (e.g., supportable carrier aggregation configuration, supportable MIMO configuration, and supportable beamforming configuration) to the base station.

If the UE 501 receives the RRC Connection Setup message at step 537, a signaling radio bearer 1 (SRB1) may be established between then UE 501 and the base station. The UE 501 may transmit an RRC Connection Setup Complete message to the base station at step 539. At step 541, the UE 501 may perform an EPS bearer setup procedure with a gateway and server (S/P-GW 509, MME 511, and server 513) for data communication.

If the EPS bearer is established for the UE 501, the UE 501 may receive an RRC Connection Reconfiguration message from the base station at step 543. The RRC Connection Reconfiguration message may include at least one of data radio bearer (DRB) information and 5G cell measurement configuration information. The 5G cell measurement configuration information may include at least one of 5G intra-frequency information, 5G inter-frequency information, beam measurement reference signal information, and 5G cell measurement report triggering metric information. The RRC Connection Reconfiguration message may also include DRX mode configuration information for 5G cell.

At step 545, the UE 501 may transmit an RRC Connection Reconfiguration Complete message in response to the RRC Connection Reconfiguration message. Afterward, the service starts at step 547, and the UE may perform a service setup procedure at step 549 for receiving the service through the established EPS bearer and DRB. A service request signal necessary for triggering the service setup procedure may be transmitted to a service server 513 (e.g., youtube server) in the form of a data packet. Here, the UE 501 may transmit/receive the service setup signals on the beam selected through the beamforming procedure (beam selection, beam tracking, and beam sweeping) with the base station. After completing the service setup procedure, the UE 501 may receive the service provided by the service server 513 at step 551. The signals conveying the service may be transmitted on the beam selected in the beamforming procedure with the base station. The beamforming procedure may be performed based on the beam measurement reference signal transmitted by the base station as denoted by reference number 553.

Figure 6:
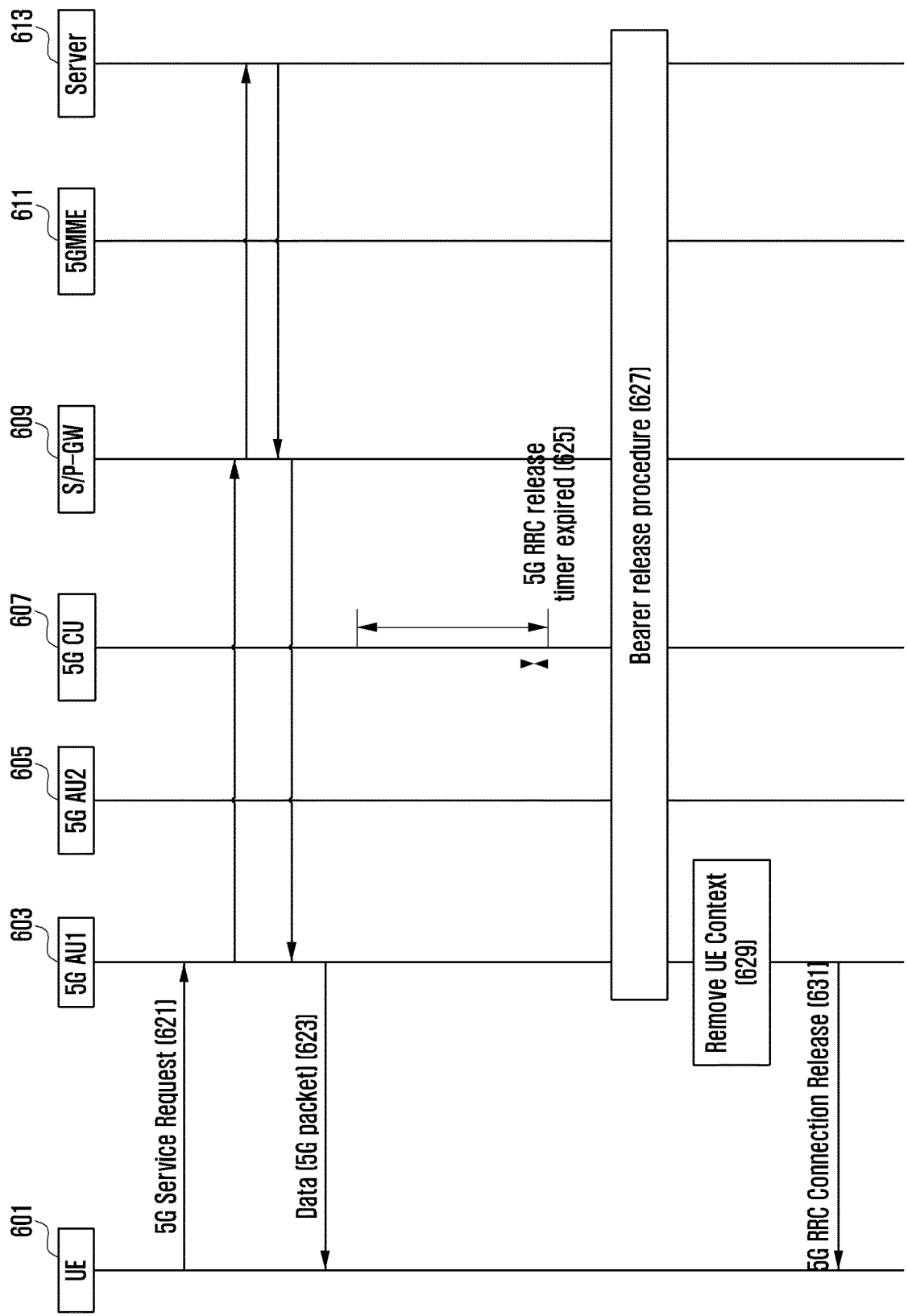
FIG. 6 is a signal flow diagram illustrating a connection release procedure of a UE in a 5G system according to another embodiment of the present invention.

FIG. 6 is a signal flow diagram illustrating signal flows between a UE and a system during a connection release procedure in a standalone scenario of a new system according to an embodiment of the present invention.

In reference to FIG. 6, the UE 601 may perform a service setup procedure for receiving a service through the established EPS bearer and DRB at step 621 and receive service data packets through the base station/S-GW/P-GW at step 623. The service data packet transmission may be performed using a beam selected in the beamforming procedure between the UE 601 and the base station. The base station (5G CU 607) may detect the expiry of the 5G RRC release timer at step 625 in the course of transmitting a signal including the service data packet to the UE 601. If the 5G RRC release timer expires, the base station (5G CU 607) may perform an RRC Connection release procedure with the S/P-GW 609 and MME 611 at step 627 for releasing the RRC connection of the UE 601.

The base station (5G AU1 603) may release the radio context of the UE (e.g., RNTI, 5G cell measurement configuration information, and DRX mode configuration information) at step 629. The base station (5G AU1 603) may transmit a 5G RRC Connection Release message to the UE 601 at step 631.

If the 5G RRC Connection Release message is received, the UE 601 may release the RRC context related to the 5G cell (base station). The UE 601 may transmit a response to the base station in response to the 5G RRC Connection Release message. Alternatively, the base station may release the radio context for the UE, e.g., RNTI, 5G cell measurement configuration information, and DRX mode configuration information, when the response is received from the UE 601. After the 5G RRC connection is released, the UE 601 may turn off the 5G modem or perform a cell search procedure to search for a 5G AU.

It is obvious that the UE 601 may receive the service via the LTE system after turning off the 5G modem if it supports the LTE system.

As another alternative example of releasing system connection of the UE, the base station may check the buffer status of the UE 601 to determine that no 5G radio (5G system) is necessary for serving the UE 601. The base station may perform the 5G RRC connection release procedure with the S/P-GW 609 and MME 611 and transmit a 5G RRC Connection Release message to the UE 601. If the 5G RRC Connection Release message is received, the UE 601 may release the RRC Context related to the 5G cell (base station). Meanwhile, the UE 601 may transmit a response to the base station in response to the 5G RRC Connection Release message. The base station may release the 5G context (5G radio context) for the UE 601. After the 5G RRC Connection is released, the UE 601 may turn off the 5G modem or perform a cell search procedure to search for a 5G AU.

It is obvious that the UE 601 may receive the service via the LTE system after turning off the 5G modem if it supports the LTE system.

As another alternative example of releasing system connection of the UE, the UE 601 may transmit an RRC Connection Release Request message to the base station, and the base station may transmit an RRC Connection Release Confirm message in reply. The UE 601 may operate an RRC context release timer to transmit the RRC Connection Release Request message. If the 5G communication service application is deactivated, the application processor (AP) of the UE 601 may generate a command instructing release of the RRC connection to its 5G modem, which may transmit the RRC Connection Release Request message. If the RRC Connection Release Request message is received from the UE 601, the base station may perform the 5G RRC Connection release procedure with the S/P-GW 609 and the MME 611 and transmit a 5G RRC Connection Release message to the UE 601. Upon receipt of the 5G RRC Connection Release message, the UE 60 may release the RRC context related to the 5G cell (base station). In response to the RRC Connection Release message, the UE 601 may transmit a response to the base station. The base station may release the 5G context (5G radio context) for the UE 601. After releasing the 5G RRC Connection, the UE 601 may turn off the 5G modem or perform a cell search procedure to search for a 5G AU.

According to an embodiment of the present invention, it may be possible to configure such that the 5G UE 601 enters a DRX mode instead of releasing the RRC Context between the 5G UE 601 and the base station when the 5G service is terminated at the UE 601. The RRC Context of the 5G UE 601 may be stored in the 5G UE 601 and the base station, which use the RRC Context at the timing when the 5G service of the 5G UE 601 is resumed. The DRX mode may be configured with an off duration that is longer than that of the DRX of the legacy 4G system and maintain the RRC context.

Figure 7:
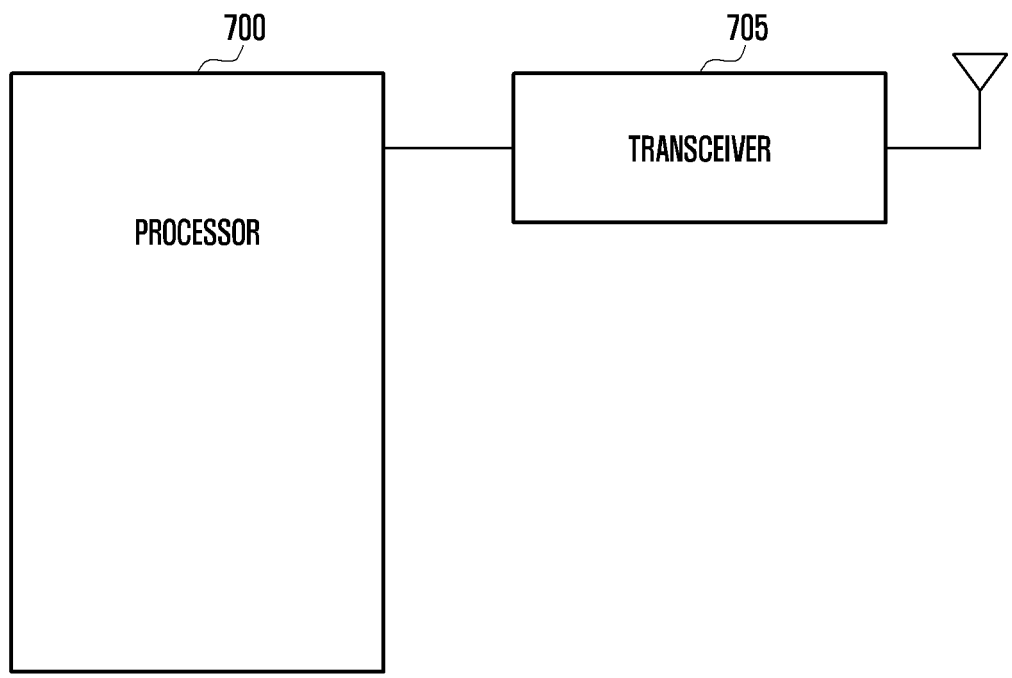
FIG. 7 is a block diagram illustrating a schematic configuration of a UE according to an embodiment of the present invention.

FIG. 7 is a block diagram illustrating a schematic configuration of a UE according to an embodiment of the present invention.

In reference to FIG. 7, the UE may include at least one processor 700 and a transceiver 705.

The transceiver 705 may communicate signals with an LTE eNB and/or 5G eNB

The processor 700 may implement the operations of the UE according to the above-described various embodiments of the present invention. For example, the processor 700 may include an LTE modem for LTE communication and a 5G modem for 5G communication.

According to an embodiment of the present invention, the processor 700 may control performing of LTE data communication via the LTE eNB and receive configuration information (e.g., RRC connection information) for 5G communication from the LTE eNB and the 5G eNB. The processor 700 may control reporting of a result of measurement on at least one beamforming reference signal (e.g., BMRS) received from the 5G eNB to the LTE eNB or the 5G eNB. The processor 700 may control configuring of a 5G connection with the 5G eNB based on the measurement result.

Figure 8:
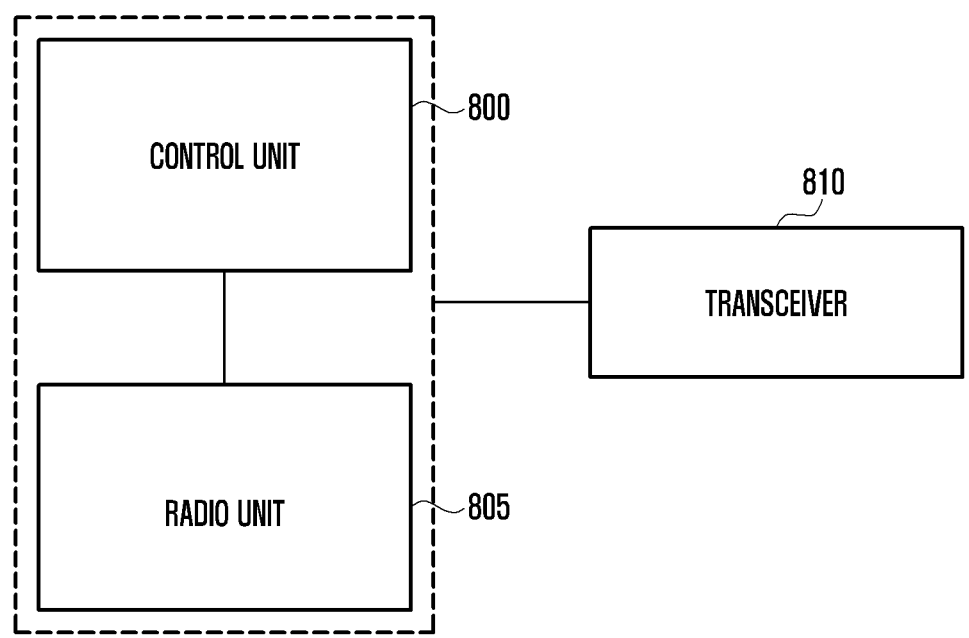
FIG. 8 is a block diagram illustrating a schematic configuration of an eNB according to an embodiment of the present invention.

FIG. 8 is a block diagram illustrating a schematic configuration of a base station according to an embodiment of the present invention. The base station depicted in FIG. 8 may be an LTE eNB or a 5G eNB.

As described above, the base station may include a control unit (e.g., CU) and a radio unit (e.g., AU), and the control unit and the radio unit may be implemented as separate devices or as a single device. In the case that the radio unit and the control unit are implemented as separate devices, they may be connected through an interface.

The base station may include at least one processor and a transceiver 810. For example, the at least one processor may include a control unit 800 and a radio unit 805. The control unit 800 and the radio unit 805 may be connected to different transceivers.

The transceiver 810 may communicate signals with a UE through a radio communication link (LTE or 5G) and communicate signals with another base station or device through a wired link.

The processor may implement the operations of the base station according to the above-described various embodiments of the present invention.

If the base station is an LTE eNB, the processor may control performing of LTE-based data communication with a UE connected through LTE. The processor may control transmitting of configuration information (e.g., RRC connection information) for 5G connection. The processor may control receiving of a measurement result from the UE, the measurement being performed on at least one beamforming reference signal transmitted from the 5G base station to the UE based on the configuration information.

For example, if the base station is a 5G eNB, the processor may control transmitting of configuration information (e.g., RRC connection information) for 5G connection to the UE that performs LTE data communication with the LTE eNB. The processor may control receiving of the result of a measurement performed on at least one beamforming reference signal based on the configuration information. The processor may control configuring of a second radio communication link to the UE based on the measurement result.

Figure 9:
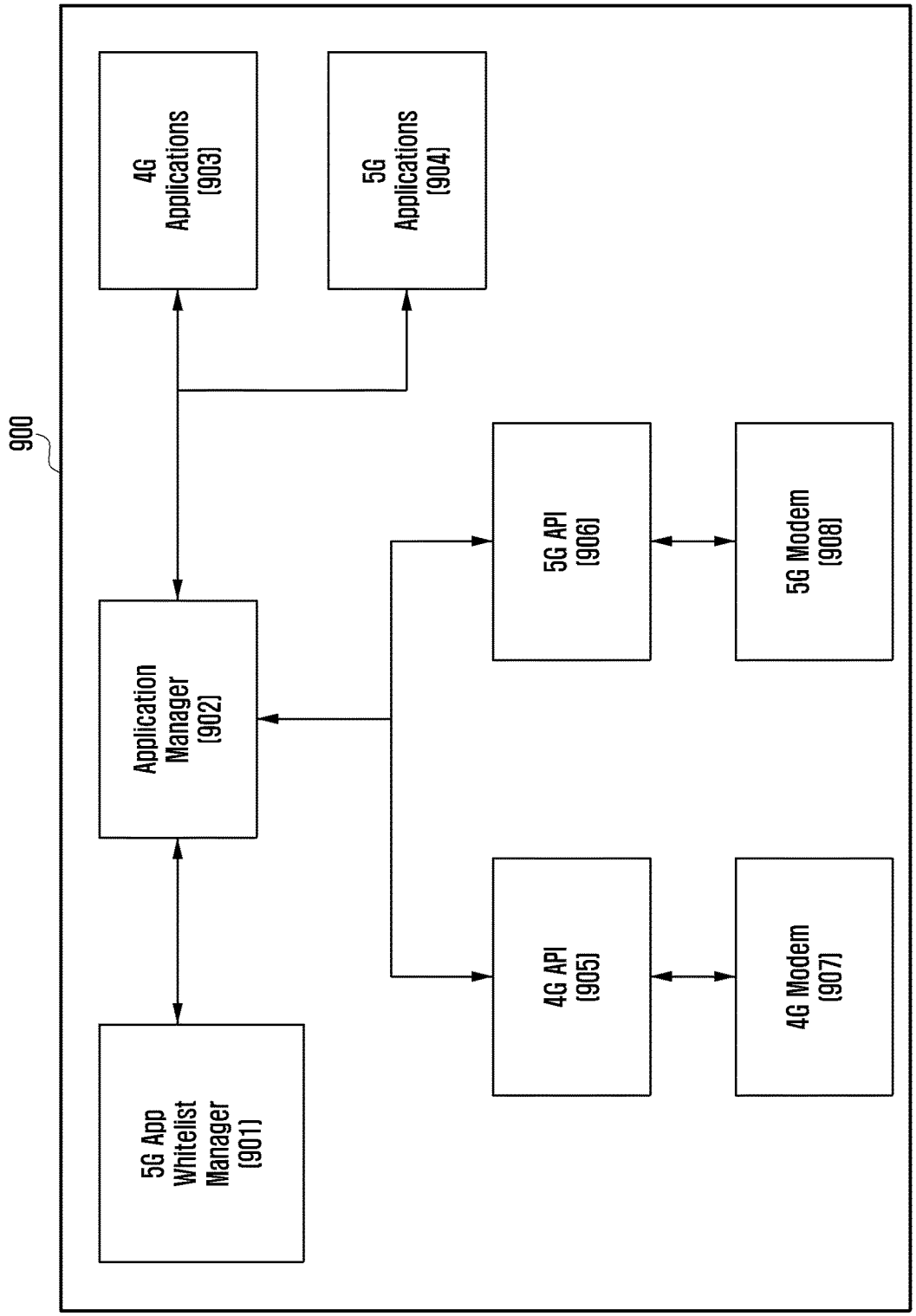
FIG. 9 is a block diagram illustrating a configuration of an internal device for turning on a 5G modem based on 5G application list information in a UE according to an embodiment of the present invention.

FIG. 9 is a block diagram illustrating an internal device 900 of a UE that turns on a 5G modem based on the 5G application list information in FIG. 3A of the present invention. For example, the internal device 900 may include the processor 700 of FIG. 7.

A 5G App Whitelist Manager 901 manages a 5G application name list. The 5G application name list may be stored in the manufacturing phase of the UE or received from the LTE/5G eNB or network through signaling. The Application Manager 902 may monitor the 4G and 5G applications 903 and 904 that are currently running in the UE. The Application manager 902 may determine whether the applications 903 and 904 running in the UE are included in the 5G application name list stored in the 5G App whitelist manager. If the applications 903 and 904 running in the UE are included in the 5G application name list, the Application manager 902 may send the 5G API 906 a signal for activating the 5G modem 908. If a 4G application is running, the Application manager 902 may send the 4G API 905 a signal for activating the 4G modem 907. The 4G API 905 may generate an ON/OFF command to the 4G modem 907 according to the signal from the application manager 902.

Figure 10:
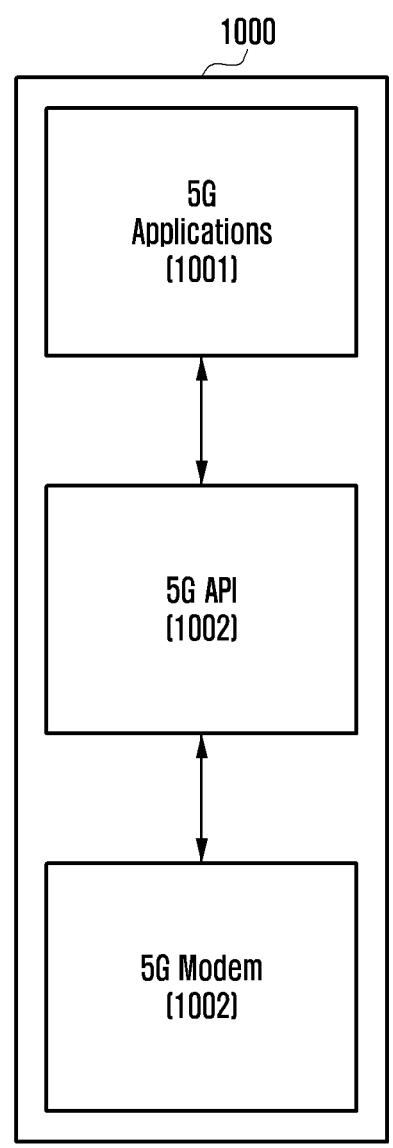
FIG. 10 is a block diagram illustrating a configuration of an internal device for turning on a 5G modem based on 5G application list information in a UE according to another embodiment of the present invention.

FIG. 10 is a diagram for explaining an operation for a 5G application to turn on a 5G modem according to an embodiment of the present invention. If the 5G application 1001 is executed, it may generate a signal to the 5G API 1002 and then the 5G API 1002 may generate an ON/OFF command to the 5G Modem 1003.

Hereinafter, a description is made of the method for a master eNB that operates a macro cell to add a secondary cell, e.g., millimeter wave (mmWave) cell or a cell operating at a frequency higher than LTE frequency, to the UE according to various embodiments of the present invention. However, the secondary cell is not limited to the aforementioned cells. In the following description, the secondary cell may be interchangeably referred to as secondary carrier, mmWave cell, mmWave carrier, and high frequency cell.

In the following description, although referred to as an mmWave cell, the secondary cell has the capability as follows. A secondary cell eNB may operate on an LTE frequency, mmWave frequency, or a frequency in a band higher or lower than the LTE band. The secondary cell eNB may be a base station of a cellular technology or Wi-Fi/wigig technology. The secondary cell eNB may have the same capability as that of a macro cell eNB. The secondary cell eNB may perform the operation of part of the functions of a normal eNB (e.g., user plane packet transmission/reception without RRC function). Alternatively, the secondary cell eNB may have a functionality smaller than that of the macro cell eNB. For example, the secondary cell eNB may become a transmitting device or a transmission/reception point (TRP) or have only the PHY layer or the PHY layer and MAC sublayer. For example, the secondary cell eNB may have a connection to a gateway. Alternatively, the secondary cell eNB may have no connection to a gateway. In the following description, the eNB having the above characteristics may be interchangeably referred to as a high frequency (HF) BS, mmWave cell eNB, and secondary eNB (SeNB).

Various embodiments of the present invention may be considered when a secondary cell is located within the coverage of a macro cell. For example, at least one low frequency eNB becomes a master eNB, and multiple mmW cells may form a secondary cell cluster.

In this situation, the RRC connected mode operation is performed as follows. First, the UE connects to a low frequency eNB (master eNB). The low frequency eNB may add a secondary cell (e.g., mmW cell) to meet the requirements for a large volume of data. Since the RRC is anchored to the low frequency eNB, the UE may avoid handover failure even when failing to transmit a handover signal on the secondary carrier (mmW carrier). The UE in the idle mode may perform cell selection and monitor the low frequency for a paging message. The system information and paging signal may be transmitted through the macro cell but not through the secondary cell.

Figure 11:
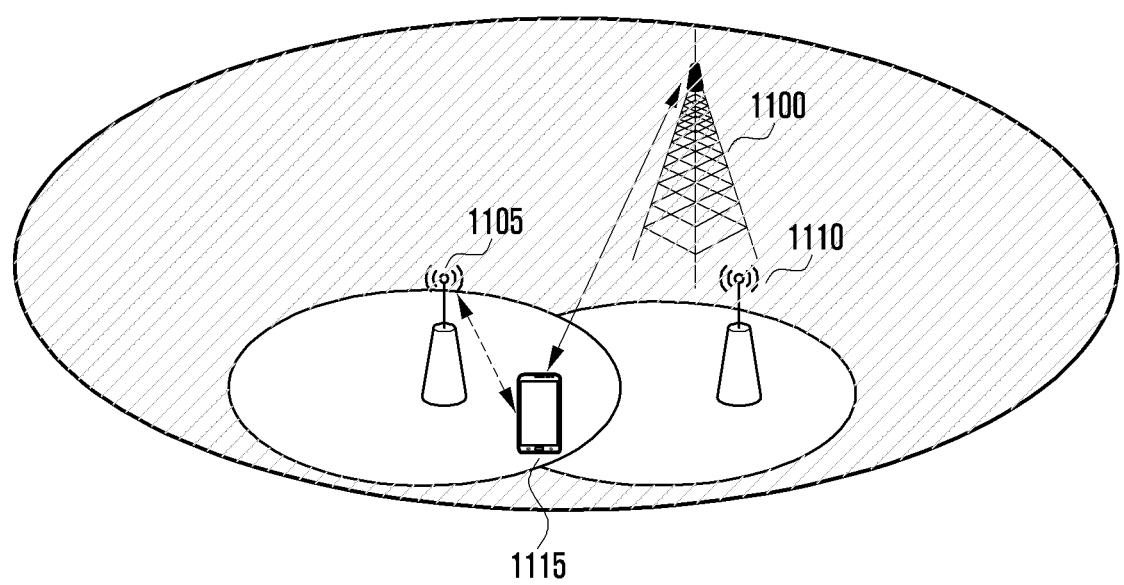
FIG. 11 is a diagram illustrating a situation where a UE located within a coverage of the master eNB is connected to the master eNB and a secondary eNB according to an embodiment of the present invention.

FIG. 11 is a diagram illustrating a situation where a UE located within a coverage of the master eNB is connected to the master eNB and a secondary eNB according to an embodiment of the present invention.

In reference to FIG. 11, a low frequency (LF) eNB 1100 may become the access point of control information, and a UE 1115 may connect to secondary eNBs 1105 and 1110 for high data rate data communication. The LF eNB 1100 may perform low volume data communication with the UE 1115. The low frequency is characterized by a low pathloss in comparison with a high frequency; thus, the coverage of the LF eNB 1110 may include the coverage of the small size high frequency cell. The UE 1115 may at least connect to the LF eNB 1100 and may have two or more connections: connection via the LF eNB 1100 and connections via the high frequency eNBs 1105 and 1110.

In order to add a secondary cell to the UE, the UE may perform secondary cell search and measurement and determine whether to add the secondary cell based on the search and measurement result. According to which one triggers the secondary cell search and measurement and how the secondary cell search and measurement are triggered, various embodiments may be discussed.

Figure 12:
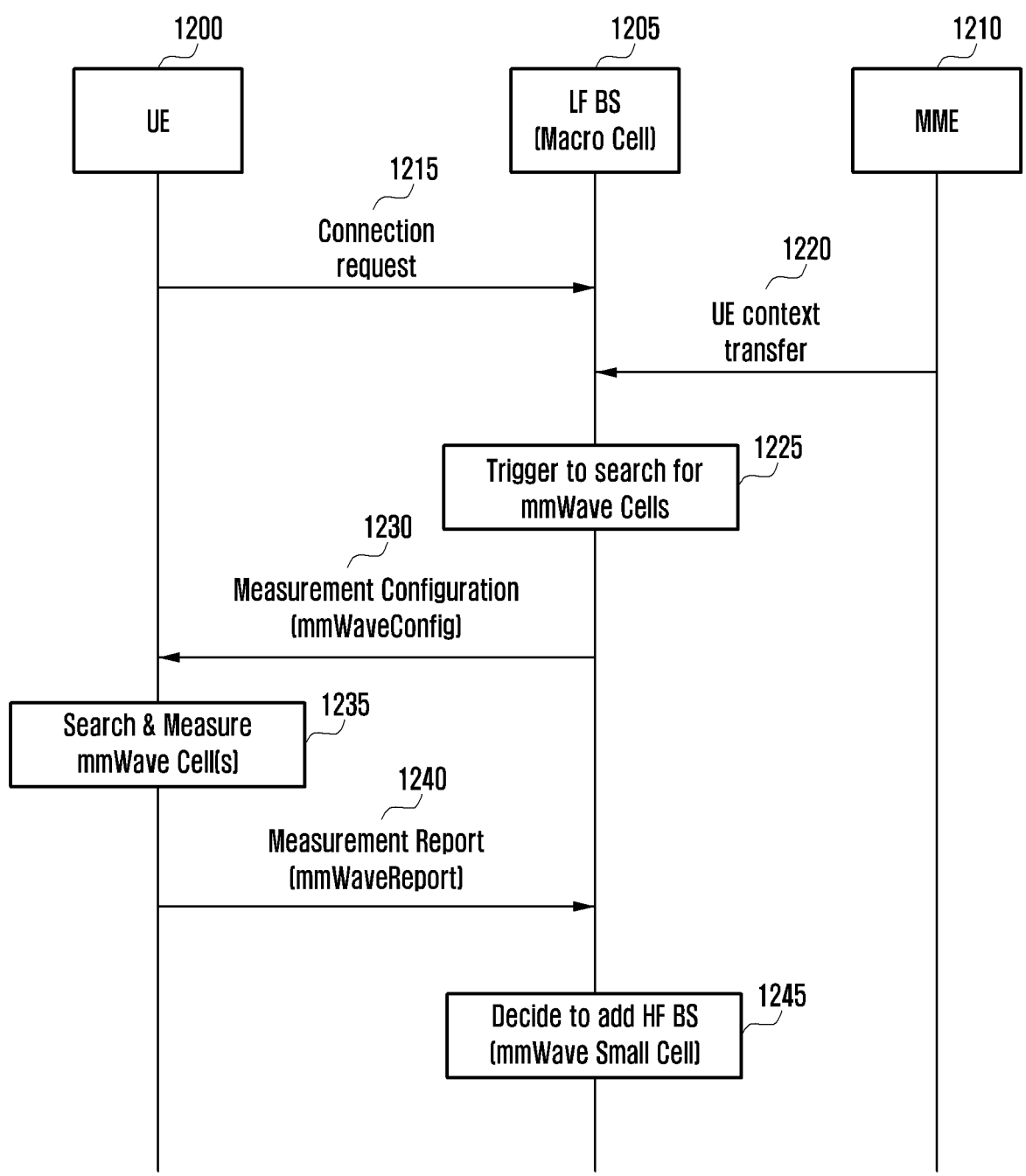
FIG. 12 is a signal flow diagram illustrating a procedure where a macro eNB triggers secondary cell search and measurement based on UE context received from an MME after a UE has requested to the macro eNB for connection.

1) Macro eNB (e.g., LF eNB) Initiated Triggering after Connection Request from UE FIG. 12 is a signal flow diagram illustrating a procedure where a macro eNB triggers secondary cell search and measurement based on UE context received from an MME after a UE has requested to the macro eNB for connection.

At step 1215, the UE 1200 may transmit a connection request to the macro cell (e.g., LF cell). According to the EPS core network operation, the MME 1210 may establish an EPS bearer with an appropriate QoS parameter based on the subscription information of the UE 1200. At step 1220, the EPS bearer information related to the corresponding UE may be transmitted, in the state of being contained in UE context, to the macro eNB 1205 to which the UE has requested for connection.

First, the macro eNB 1205 may determine whether there is a mmWave cell that it can control and which can be used for the UE 1200. Second, the macro eNB 1205 may determine whether the EPS bearer has a QoS factor for high data rate data based on the UE context received from the MME 1210. Third, the macro eNB 1205 may determine whether the UE has the capability of operating in the high frequency band. The UE capability information may be acquired from the connection request transmitted to the macro eNB at step 1215 or by inquiring to the low frequency eNB 1205. The aforementioned three conditions may be tested in sequence or simultaneously.

If all of the three conditions are fulfilled, the macro eNB 1205 may trigger high frequency cell search at step 1225. For example, the macro eNB 1205 may request to the UE 1200 for high frequency operation capability, and the UE 1200 may reply to the request.

The macro eNB 1205 may transmit a high frequency cell measurement configuration (e.g., mmWave config) to the UE 1200 at step 1230. The measurement configuration may be broadcast through a broadcast channel or transmitted through a UE-specific channel.

The UE 1200 may perform high frequency cell (e.g., mmWave cell) search and measurement at step 1235. If a predetermined event occurs, the UE may report the measurement result to the macro eNB 1205 at step 1240. The macro eNB may determine at step 1245 whether to add at least one high frequency cell for the UE based on the measurement result.

Figure 13:
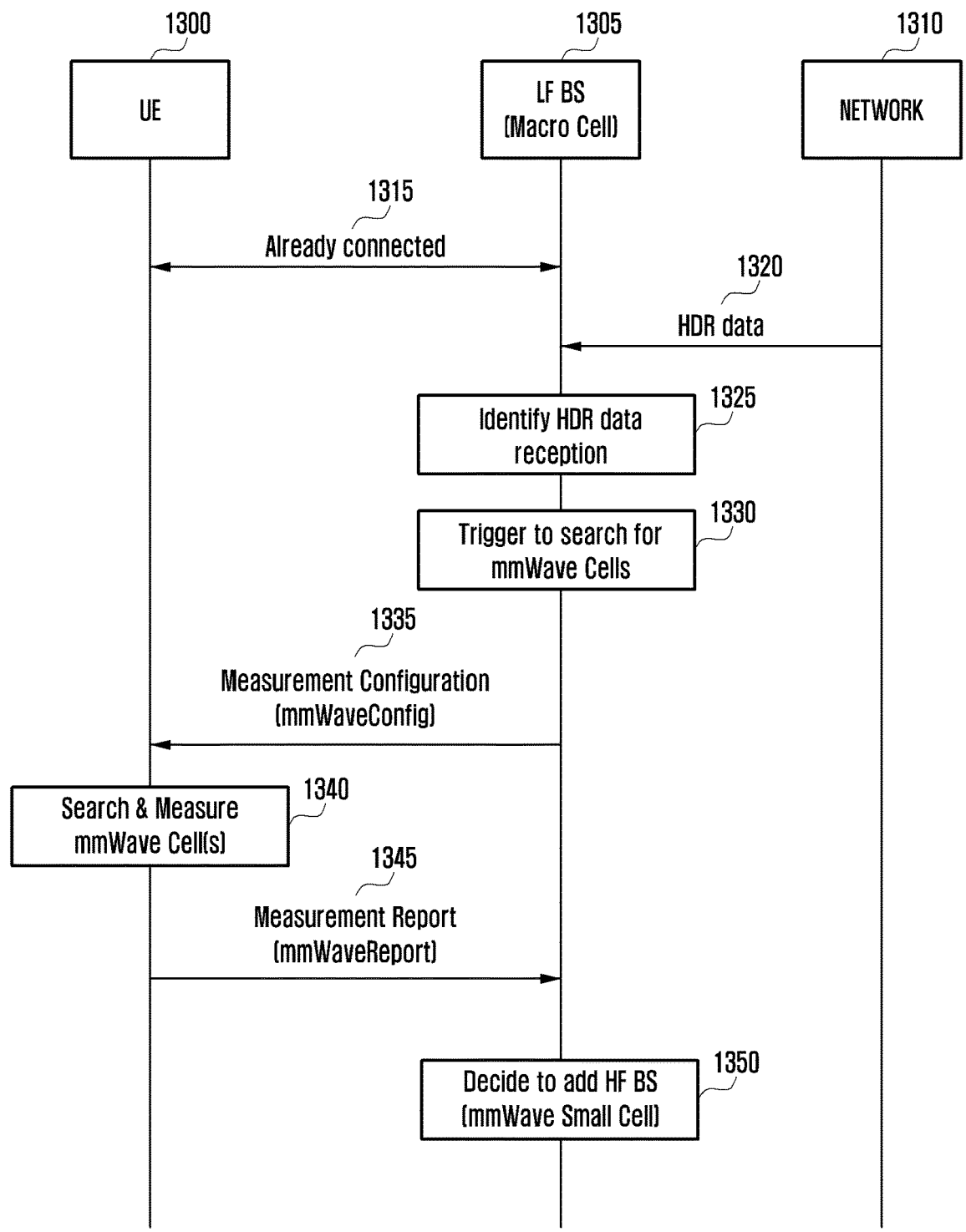
FIG. 13 is a signal flow diagram illustrating a procedure where a macro eNB triggers secondary cell search and measurement based on a predetermined type of data from the network after a UE has connected to the macro eNB.

2) Macro eNB (e.g., LF eNB) Initiated Triggering Upon Detection of Downlink Data Occurrence after Connection FIG. 13 is a signal flow diagram illustrating a procedure where a macro eNB triggers secondary cell search and measurement based on a predetermined type of data from the network after a UE has connected to the macro eNB.

At step 1315, the UE 1300 is already in the RRC connected state with the macro eNB 1305.

If downlink data traffic occurs afterward in a server (not shown) of the network 1310, the macro eNB 1305 may receive the data from the network 1310 at step 1320. The data may be a predetermined type of data, e.g., high data rate data.

The macro eNB 1305 may determine at step 1325 whether the data is a predetermined type of data, e.g., high data rate data, based on a received factor of EPS bearer or an indicator indicative of high data rate data that an MME or a gateway transmits along with data traffic.

At step 1330, the macro eNB 1305 may trigger secondary cell search, e.g., high frequency cell search, when the data amount accumulated in a buffer is equal to or greater than a predetermined size. Optionally, the macro eNB 1305 may inquire to the UE 1300 about the high frequency operation capability and start the search. Here, the high frequency operation capability information may be acquired from RRC connection requests transmitted to the macro eNB 1305 or by inquiring to the UE 1300 after receiving the high data rate data from the network.

Afterward, the macro eNB 1305 may transmit high frequency cell measurement configuration (e.g., mmWave config) to the UE 1300 at step 1335. The measurement configuration may be broadcast through a broadcast channel or transmitted through a UE-specific channel.

The UE 1300 may perform high frequency cell (e.g., mmWave cell) search and measurement at step 1340. The UE 1300 may report the measurement result to the macro eNB 1305 at step 1345. The macro eNB 1305 may determine at step 1350 whether to add at least one high frequency cell for the UE based on the measurement result.

After the high frequency cell is added for the UE 1300, high data rate data is transmitted via the SeNB that controls the high frequency cell. That is, if no high data rate data is received from the network 1310 over a predetermined time or a high data rate data hold indicator is given to the UE 1300, the macro eNB 1305 may release or deactivate the SeNB. If the SeNB has already been added but in the deactivated state and, in this state, if high data rate data occurs again, the macro eNB 1305 may activate the SeNB without adding an extra SeNB.

Figure 14:
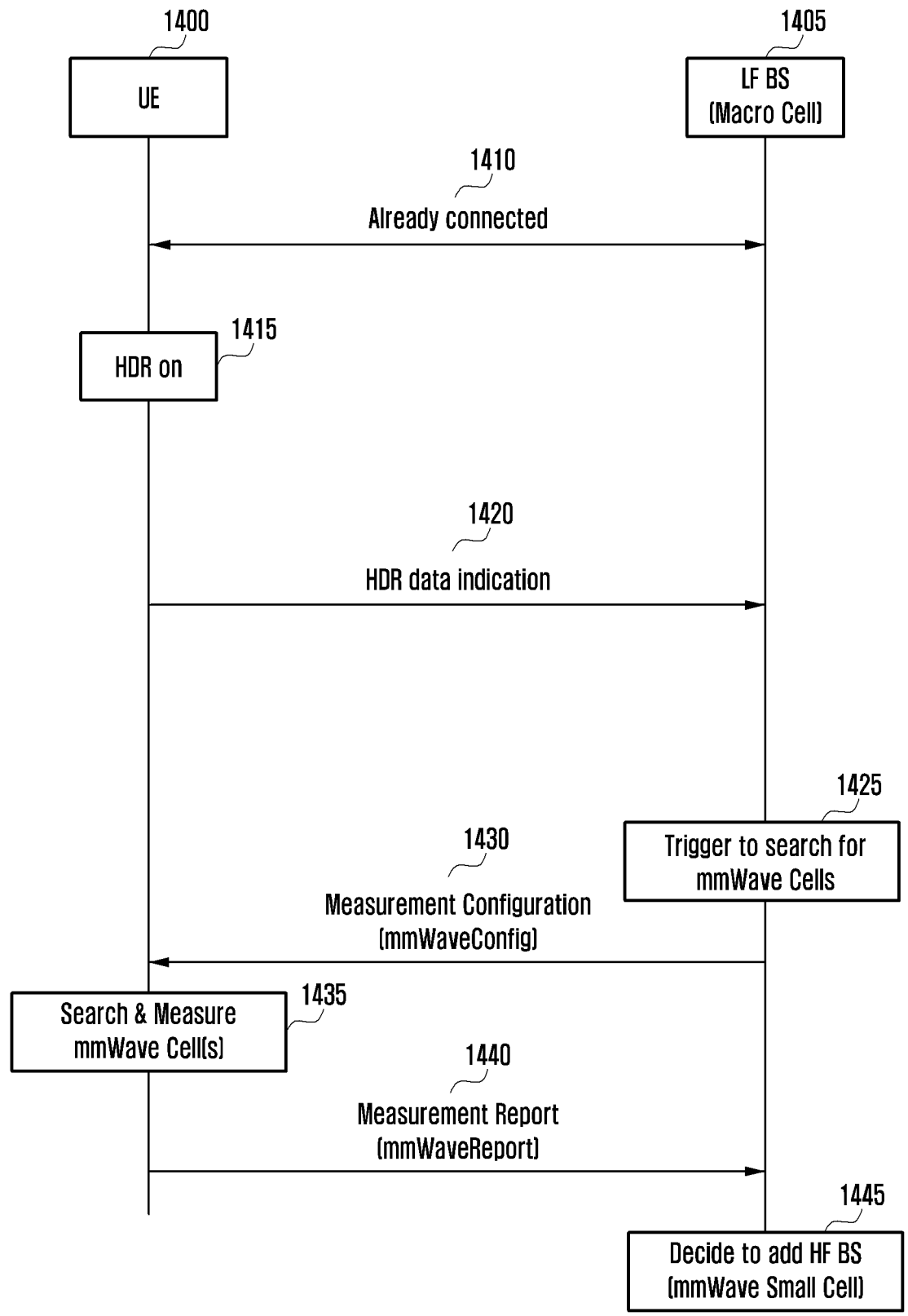
FIG. 14 is a signal flow diagram illustrating a procedure where a macro eNB triggers secondary cell search and measurement based on a predetermined type of uplink data from a UE connected to the macro eNB.

3) Macro eNB (e.g., LF eNB) Initiated Triggering Upon Detection of Uplink Data Occurrence after Connection FIG. 14 is a signal flow diagram illustrating a procedure where a macro eNB triggers secondary cell search and measurement based on a predetermined type of uplink data from a UE connected to the macro eNB.

At step 1410, the UE 1400 may be in the RRC Connected state with the macro eNB 1405.

At step 1415, the UE 1400 may detect occurrence of a predetermined type of data, e.g., high data rate data, from the application layer. If a high data rate service or application is executed, the UE 1400 may regard this as the occurrence of high data rate data. If the uplink data accumulated in the buffer of the UE 1400 is greater than a predetermined amount, this may mean an occurrence of high data rate data.

At step 1420, the UE 1400 may transmit to the macro eNB 1405 a message indicating the predetermined type of data, e.g., high data rate data indication message. The predetermined data type may be indicated by transmitting logical channel information in the buffer status report (BSR) or an indicator in a MAC CE. It may also be possible to transmit a different service type indicator. The service type indicator is described later in detail.

Optionally, the macro eNB 1405 may inquire to the UE 1400 about high frequency cell capability. This information may be acquired from the RRC Connection request.

If the UE has the high frequency operation capability, the macro eNB 1405 may trigger secondary cell (e.g., high frequency cell) search at step 1425. At step 1430, the macro eNB 1405 may transmit measurement configuration (e.g., mmWave config) for high frequency cell search to the UE 1400. The measurement configuration may be broadcast through a broadcast channel or transmitted through a UE-specific channel.

At step 1435, the UE 1400 may search for a high frequency cell (e.g., mmWave cell) and perform measurement. At step 1440, the UE 1400 may report a measurement result to the macro eNB 1405. At step 1445, the macro eNB 1405 may determine to add at least one high frequency cell for the UE based on the measurement result.

After the high frequency cell is added, the high data rate data is transmitted via the SeNB and, if the high data rate data occurrence stops, the SeNB may be released or deactivated. The UE 1400 may transmit to the macro eNB 1405 an indicator indicating that the high data rate data occurrence has stopped. If the SeNB has already been added but in the deactivated state and, in this state, if high data rate data occurs again, the macro eNB 1405 may activate the SeNB without adding an extra SeNB.

Figure 15:
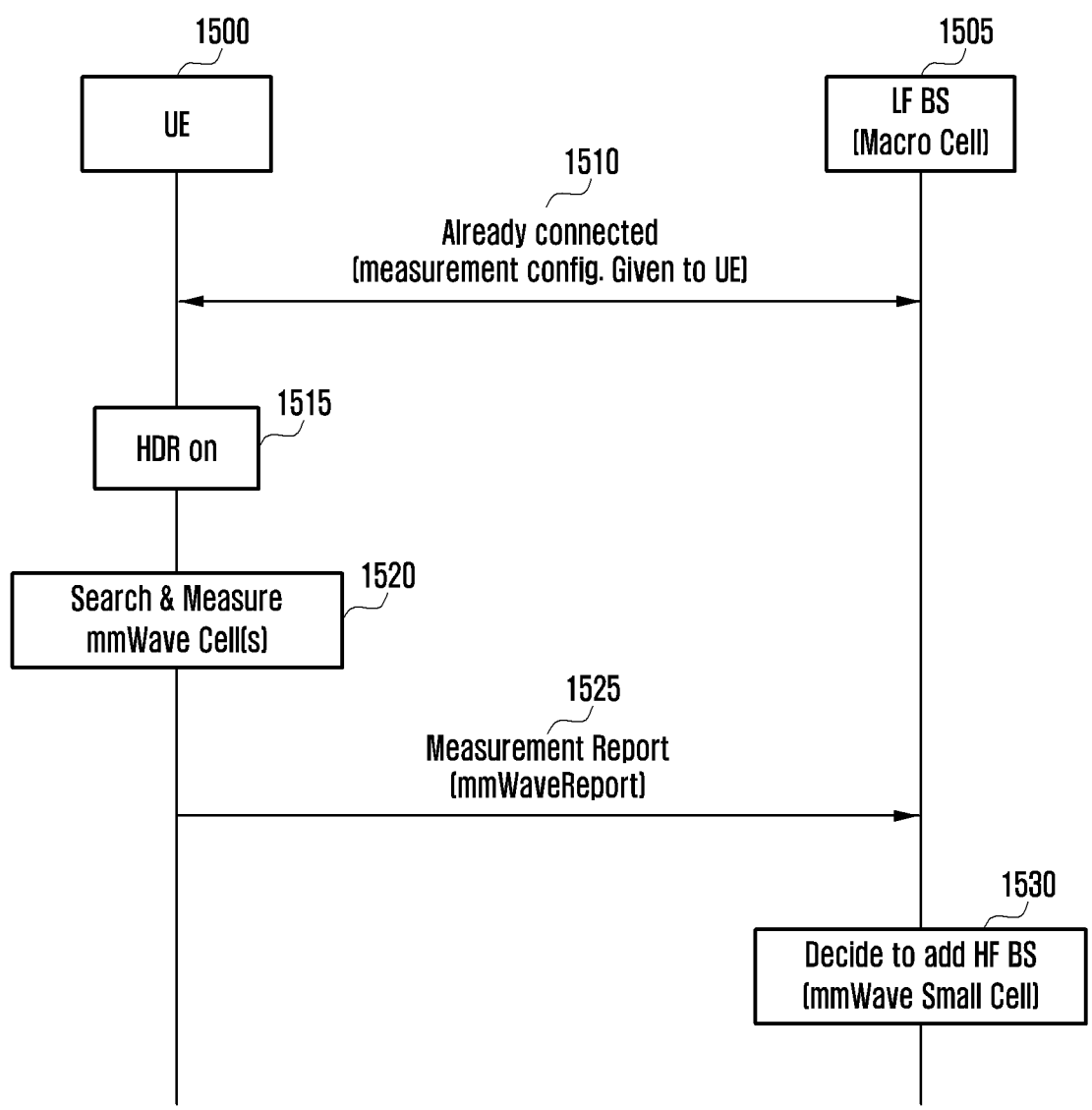
FIG. 15 is a signal flow diagram illustrating a procedure where a UE triggers secondary cell search and measurement based on a predetermined type of uplink data occurring at the UE after being connected to a macro eNB.

4) UE Initiated Triggering Upon Detection of Uplink Data Occurrence after Connection FIG. 15 is a signal flow diagram illustrating a procedure where a UE triggers secondary cell search and measurement based on a predetermined type of uplink data occurring at the UE after being connected to a macro eNB.

At step 1510, the UE 1500 may already be in the RRC connected state with the macro eNB 1505 at step 1510.

At step 1515, the UE 1500 may detect occurrence of a predetermined type of data, e.g., high data rate data, from the application layer. If a high data rate service or application is executed, the UE 1500 may regard this as the occurrence of high data rate data. If the uplink data amount accumulated in the buffer of the UE 1500 is greater than a predetermined amount, this may mean occurrence of high data rate data.

If the UE 1500 detects the occurrence of the high data rate data, it may perform high frequency cell (e.g., mmWave cell) search and measurement at step 1520. The high frequency measurement configuration (e.g., mmWave config) may be received from the macro eNB 1505 in advance. The measurement configuration may be broadcast through a broadcast channel or transmitted through a UE-specific channel.

At step 1525, the UE 1500 may report the measurement result to the macro eNB 1505. At step 1530, the macro eNB 1505 may determine to add at least one high frequency cell based on the measurement result.

After the high frequency cell is added, the high data rate data is transmitted via the SeNB and, if the high data rate data occurrence stops, the SeNB may be released or deactivated. The UE 1500 may transmit to the macro eNB 1505 an indicator indicating that the high data rate data occurrence has stopped. If the uplink data buffered in the uplink data buffer of the UE 1500 is less than a predetermined amount, the UE 1500 may determine that the high data rate data occurrence has stopped. If the SeNB has already been added but in the deactivated state and, in this state, if high data rate data occurs again, the macro eNB 1505 may activate the SeNB without adding an extra SeNB.

Figure 16:
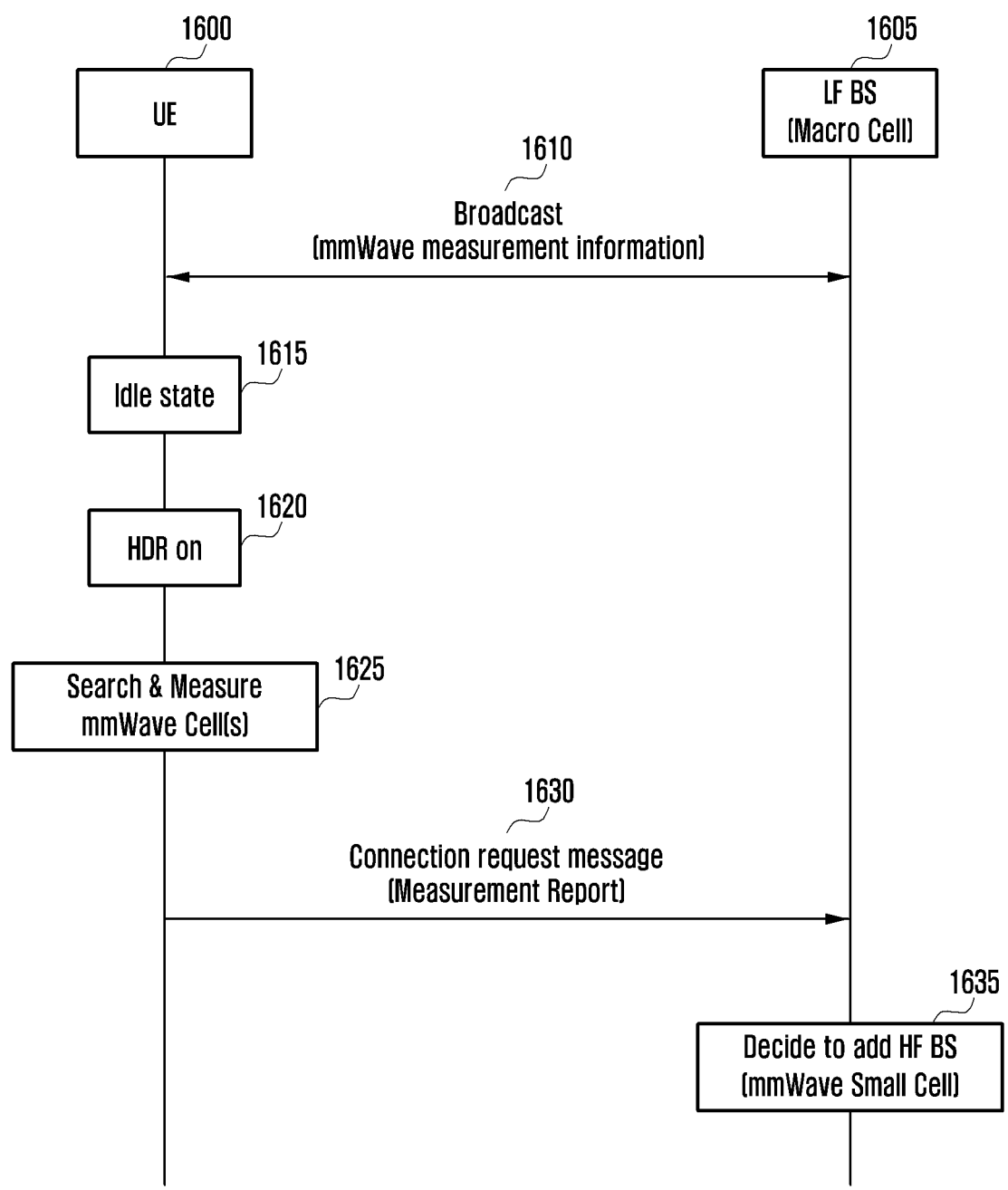
FIG. 16 is signal flow diagram illustrating a procedure where a UE triggers secondary cell search and measurement based on a predetermined type of uplink data occurring at the UE in the idle state.

5) UE Initiated Triggering Upon Detection of Uplink Data Occurrence in Idle State FIG. 16 is signal flow diagram illustrating a procedure where a UE triggers secondary cell search and measurement based on a predetermined type of uplink data occurring at the UE in the idle state.

This embodiment is directed to the case where the UE 1600 is in the idle state.

At step 1610, the macro eNB 1605 may continue broadcasting measurement configuration (e.g., mmWave config) for high frequency cell search and measurement to the UE 1600 through a broadcast channel while the UE 1600 stays in the idle state as denoted by reference number 1615.

At step 1620, the UE 1600 may detect occurrence of a predetermined type of data, e.g., high data rate data, from the application layer. If a high data rate service or application is executed, the UE 1600 may regard this as the occurrence of high data rate data. If the uplink data amount accumulated in the buffer of the UE 1600 is greater than a predetermined amount, this may also mean occurrence of high data rate data.

If the UE detects the occurrence of the high data rate data, it may perform high frequency cell (e.g., mmWave cell) search and measurement at step 1625.

At step 1630, the UE 1600 may report the measurement result to the macro eNB 1505. In this embodiment, the measurement result may be conveyed in the connection request message that is transmitted from the UE 1600 to the macro eNB 1605.

Upon receipt of the connection request, the network entities (MME, HSS, S-GW, P-GW, etc.) may cooperate to establish an RRC connection. That is, as an operation of the EPS core network, the MME may generate an EPS bearer with an appropriate QoS parameter based on the subscription information of the UE. The information on the EPS bearer established for the UE 1600 may be transmitted to the eNB 1605 to which the UE 1600 has requested for access. The macro eNB 1605 may identify the presence of the high frequency cell based on the measurement result and determine at step 1635 to add at least one high frequency cell.

After the high frequency cell is added, the high data rate data is transmitted via the SeNB and, if the high data rate data occurrence stops, the SeNB may be released or deactivated. The UE 1600 may transmit to the macro eNB 1605 an indicator indicating that the high data rate data occurrence has stopped. If the uplink data buffered in the uplink data buffer of the UE 1600 is less than a predetermined amount, the UE 1600 may determine that the high data rate data occurrence has stopped. If the SeNB has already been added but in the deactivated state and, in this state, if high data rate data occurs again, the macro eNB 1605 may activate the SeNB without adding an extra SeNB.

Figure 17:
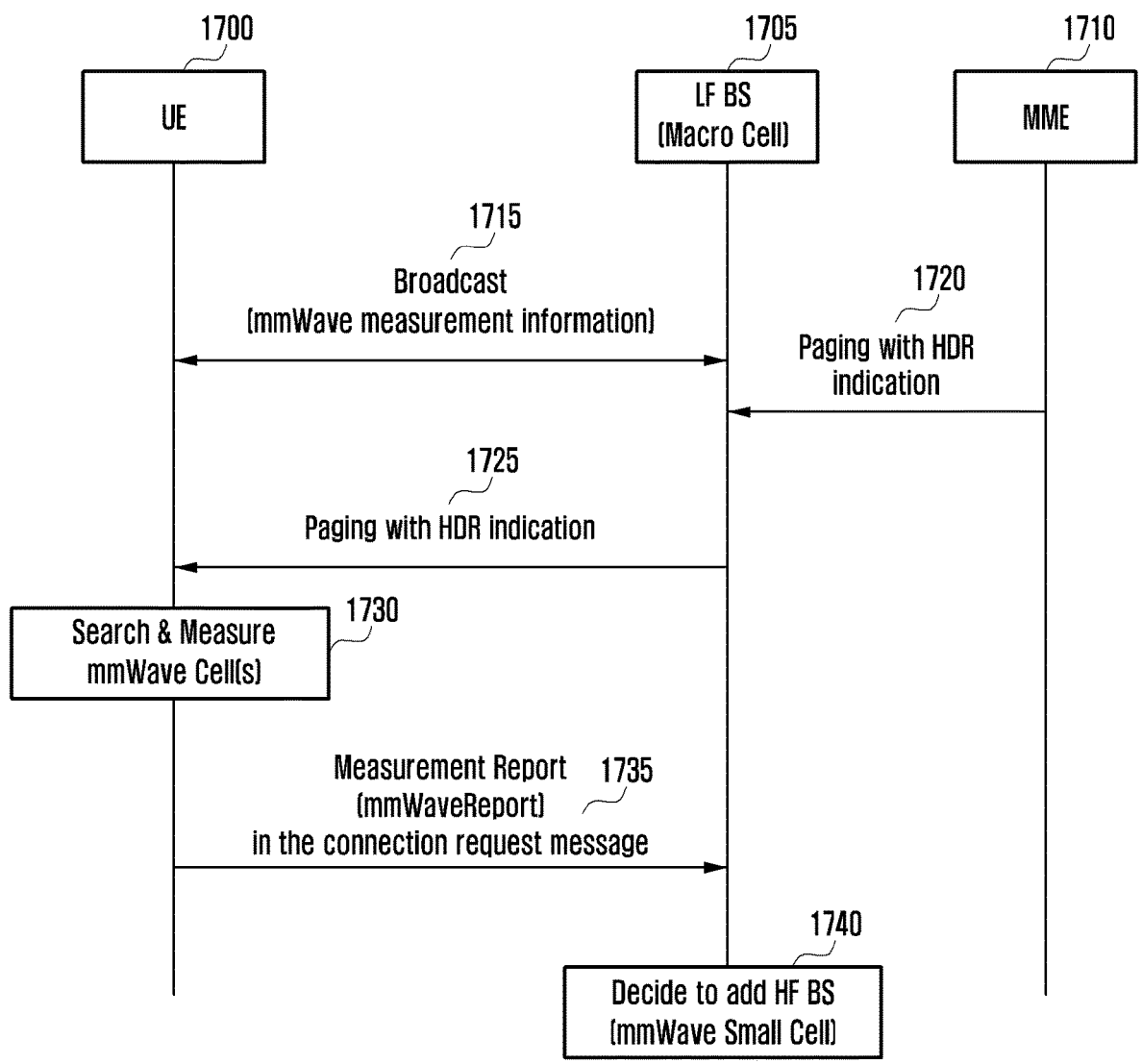
FIG. 17 is a signal flow diagram illustrating a procedure where a UE in the idle state triggers secondary cell search and measurement based on a paging message indicative of the presence of downlink data.

6) UE Initiated Triggering Upon Detection of Downlink Data Occurrence in Idle State FIG. 17 is a signal flow diagram illustrating a procedure where a UE in the idle state triggers secondary cell search and measurement based on a paging message indicative of the presence of downlink data.

This embodiment is directed to the case where the UE 1700 is in the idle state.

At step 1715, the macro eNB 1705 may continue broadcasting measurement configuration (e.g., mmWave config) for high frequency cell search and measurement to the UE 1600 through a broadcast channel.

In this situation, if a predetermined type of data, e.g., high data rate data, occurs afterward in a server (not shown) of the network, the MME 1710 may transmit to the macro eNB 1705 at step 1720 a paging message including an indicator indicative of a predetermined service type. If the service type is set to high data rate data, the macro eNB 1705 transmits an RRC paging message including an indicator set to high data rate data to the UE 1700 through PDCCH at step 1725.

Here, the high data rate data indicator included in the RRC paging message may be a 1-bit indicator. In the case that the RRC paging message includes a service type indicator, the service type indicator may be used to indicate a service type based on legacy QoS information such as QCI and ARP of the EPS bearer or to contain indication information according to a mapping rule specified in the standard specification.

Meanwhile, the RRC paging message may include at least one of paging record, UE identity, core network domain information, system information modification, ETWS indication, and service type indication.

Upon receipt of the RRC paging message, the UE 1700 may perform high frequency cell (e.g., mmWave cell) search and measurement at step 1730 according to the previously received measurement configuration.

At step 1735, the UE 1700 may report the measurement result to the macro eNB 1705. In this embodiment, the measurement result may be conveyed in the connection request message that is transmitted from the UE 1700 to the macro eNB 1705.

Upon receipt of the connection request, the network entities (MME, HSS, S-GW, P-GW, etc.) may operate to establish an RRC connection. That is, as an operation of the EPS core network, the MME may generate an EPS bearer with an appropriate QoS parameter based on the subscription information of the UE. The information on the EPS bearer established for the UE 1700 may be transmitted to the eNB 1705 to which the UE 1700 has requested for access. The macro eNB 1705 may identify the presence of the high frequency cell based on the measurement result and determine at step 1740 to add at least one high frequency cell.

After the high frequency cell is added, the high data rate data is transmitted via the SeNB and, if the high data rate data occurrence stops, the SeNB may be released or deactivated. The UE 1700 may transmit to the macro eNB 1705 an indicator indicating that the high data rate data occurrence has stopped. If the uplink data buffered in the uplink data buffer of the UE 1700 is less than a predetermined amount, the UE 1700 may determine that the high data rate data occurrence has stopped. If the SeNB has already been added but in the deactivated state and, in this state, if high data rate data occurs again, the macro eNB 1705 may activate the SeNB without adding an extra SeNB.

Figure 18:
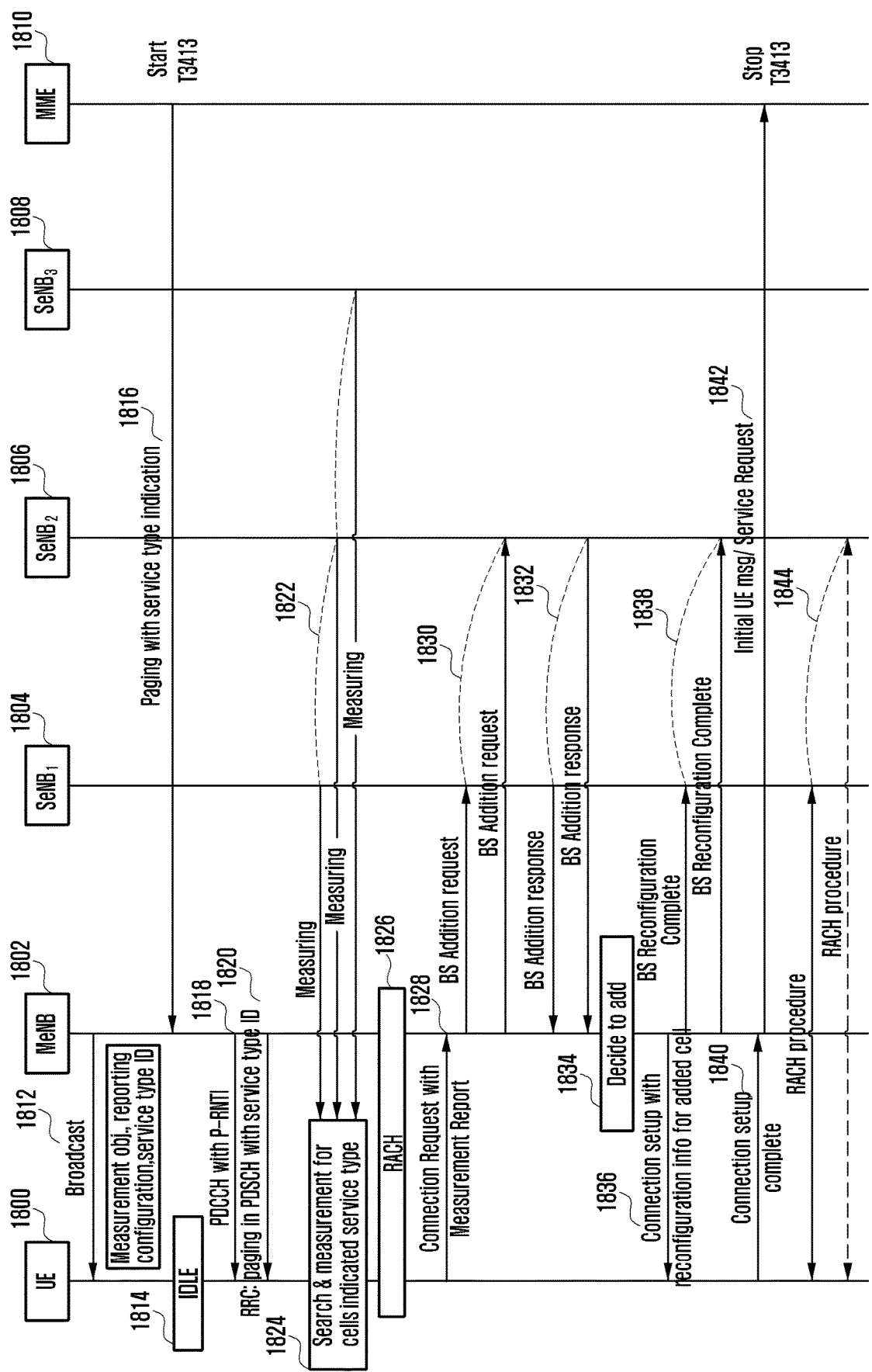
FIG. 18 is a signal flow diagram illustrating a procedure for a UE in the idle state to trigger a multiple secondary cell search procedure and measurement based on a paging message indicative of the presence of downlink data according to an embodiment of the present invention.

FIG. 18 is a signal flow diagram illustrating a procedure for a UE in the idle state to trigger a multiple secondary cell search procedure and measurement based on a paging message indicative of the presence of downlink data according to an embodiment of the present invention.

A description is made hereinafter with reference to FIG. 18 of the procedure of adding multiple SeNBs. Although it is expressed in FIG. 18 that multiple SeNBs are added, this may be interpreted as meaning that multiple secondary cells are added.

At step 1812, the MeNB (e.g., LF eNB) 1802 may broadcast predetermined frequency band measurement configuration with an ID indicative of a predetermined service type to the UE 1800. At step 1814, the UE 1800 may be staying in the idle state. At step 1816, the MME 1810 may transmit a paging message with a service type ID to the MeNB 1802. At step 1818, the MeNB 1802 may notify the UE 1800 of the resource position of the paging message using PDCCH with P-RNTI and transmit an RRC paging message to the UE 1800 at step 1820.

The UE 1800 may receive the paging message on the resource indicated with the P-RNTI in the PDCCH. At step 1824, the UE 1800 may compare the service type ID including the paging message and the service type ID given in the previous measurement configuration to retrieve the measurement configuration information mapped to the service type ID and perform channel search and measurement on the frequency corresponding to the service type ID. On the frequency corresponding to the service type ID, SeNB1 1804, SeNB2 1806, and SeNB3 1808 may be found; thus, at step 1822, channel measurement may be performed for SeNB1 1804, SeNB2 1806, and SeNB3 1808.

At step 1826, the UE 1800 may transmit a random-access channel (RACH) to the MeNB 1802. At step 1828, the UE 800 may transmit a connection request message including the measurement result to the MeNB 1802 in response to the RACH. The RACH is transmitted to the MeNB 1802 to which the UE connects to after wakeup from the idle state.

The MeNB 1802 may determine the signal strengths of the candidate SeNBs (e.g., SeNB1 to SeNB3) based on the received measurement results and select target SeNBs to be grouped into an SeNB candidate cluster. At step 1830, the MeNB 1802 may transmit an addition request message to the SeNBs (e.g., SeNB1 and SeNB2) included in the SeNB candidate cluster. Upon receipt of the addition request message, the SeNB1 1804 and the SeNB2 1806 may determine whether to accept based on their resource occupancy statuses and, if it is determined to accept, transmit to the MeNB 1802 a response message including ack at step 1832.

The MeNB 1802 may determine the SeNB to be added based on the response message and, at step 1836, transmit to the UE 1800 a connection reconfiguration message including the information for adding the SeNB. For example, if it is determined to add the SeNB1 1804 and SeNB2 1806, the MeNB 1802 may transmit the reconfiguration message including the access-related information of the SeNB1 and SeNB2 (e.g., dedicated RACH preamble information and access-related common or dedicated information) along with the respective SeNB IDs. The MeNB 1802 may transmit a reconfiguration complete message to the SeNB1 1804 and SeNB2 1806 at step 1838.

When the MeNB 1802 performs an addition request operation in association with the SeNBs included in the SeNB candidate cluster, it may transmit a UE context information to the respective SeNBs. The MeNB 1802 may use the measured signal power information included in the measurement report information when designing a handover triggering event afterward. The information on the event designed in this way may include an event name, an offset factor, and an event-specific threshold factor. The measurement configuration information related to the event may be delivered to the UE 1800 through a connection reconfiguration message.

If the connection reconfiguration message is received, the UE 1800 may use the measurement configuration and access-related factor information included in the message. In the case that the measurement configuration information is received, if a preconfigured event occurs, the UE 1800 may perform a predefined operation that is supposed to be triggered by the event. In the case where the access-related factor information is received, the UE 1800 may perform access to the corresponding cell using this information.

Upon receipt of the connection reconfiguration message, the UE 1800 may transmit a connection setup complete message to the MeNB 1802 at step 1840. The MeNB 1802 may transmit an initial UE message and/or service request message to the MME 1810 at step 1842.

The UE 1800 may perform a RACH procedure with the SeNB1 1804 and SeNB2 1806 at step 1844 to achieve synchronization and, afterward, perform data communication with the SeNB1 1804 and SeNB2 1806.

Figure 19:
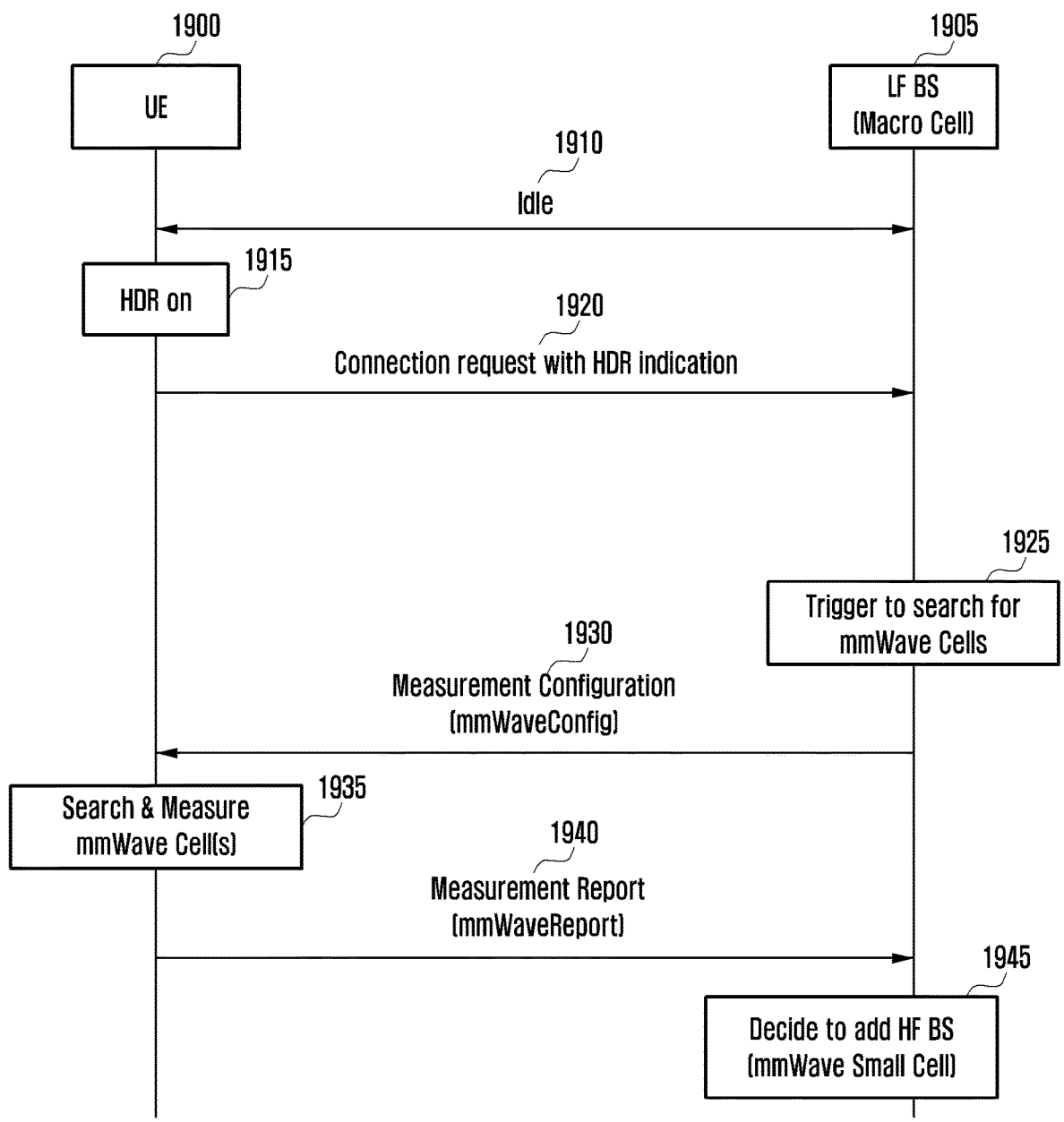
FIG. 19 is a signal flow diagram illustrating a procedure where an eNB triggers secondary cell search and measurement based on the presence of uplink data from a UE in the idle state.

7) eNB Initiated Triggering Upon Detection of Uplink Data Occurrence in Idle State FIG. 19 is a signal flow diagram illustrating a procedure where an eNB triggers secondary cell search and measurement based on the presence of uplink data from a UE in the idle state.

This embodiment is directed to the case where the UE 1600 is in the idle state as denoted by reference number 1910.

At step 1915, the UE may detect occurrence of a predetermined type of data, e.g., high data rate data, from the application layer. If a high data rate service or application is executed, the UE 1900 may regard this as the occurrence of high data rate data. If the uplink data amount accumulated in the buffer of the UE 1900 is greater than a predetermined amount, this may also mean occurrence of high data rate data.

At step 1920, the UE 1900 may transmit to the macro eNB 1905 a connection request message including a high data rate data indicator.

The macro eNB 1905 may determine whether the UE 1900 has high frequency operation capability based on the UE information conveyed in the connection request message. It may also be possible to inquire to the UE 1900 about its high frequency operation capability. If it is determined that the UE 1900 has high frequency operation capability, the macro eNB 1905 may trigger a high frequency cell search operation at step 1925 and transmit measurement configuration (e.g., mmWaveConfig) to the UE 1900 at step 1930. The measurement configuration may be broadcast through a broadcast channel or transmitted through a UE-specific channel.

At step 1935, the UE 1900 may perform high frequency cell (e.g., mmWave cell) search and measurement based on the received measurement configuration.

At step 1940, the UE 1900 may report the measurement result to the macro eNB 1905. The macro eNB 1905 may determine to add at least one high frequency cell for the UE based on the received measurement result.

Figure 20:
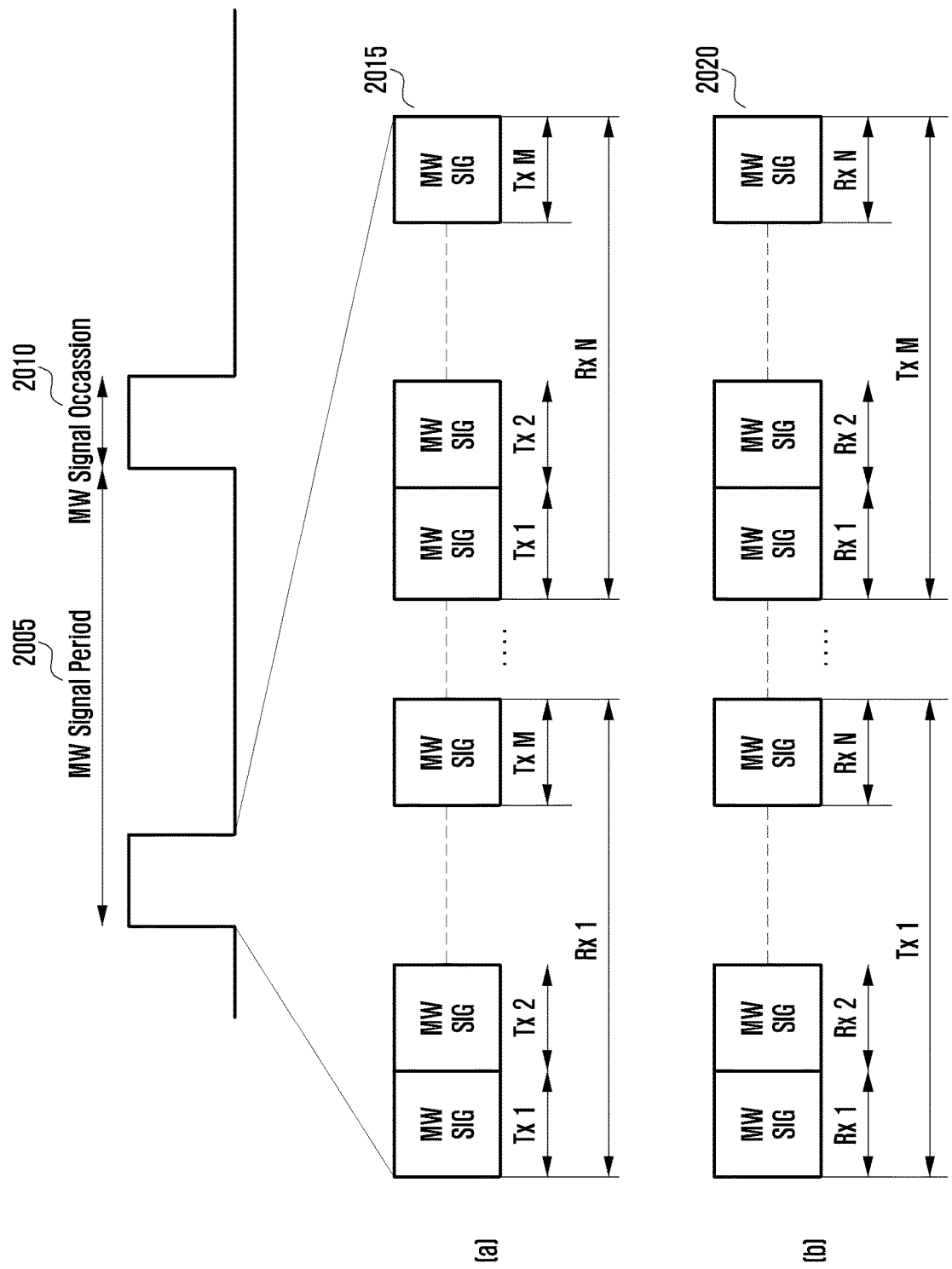
FIG. 20 is a diagram for explaining a high frequency cell search and measurement method based on beamforming according to an embodiment of the present invention.

FIG. 20 is a diagram for explaining a high frequency cell (e.g., mmWave cell) search and measurement method based on beamforming according to an embodiment of the present invention.

A signal broadcast through a high frequency cell for use in cell search and measurement may be transmitted at a predetermined interval 2005 during a transmission period 2010 determined based on a predetermined offset value. This signal may be transmitted using TX beam sweeping or received using RX beam sweeping. For example, the UE may perform measurement on the signal by sweeping the TX beam in the state of fixing the RX beam in sequence as shown in part (a) as denoted by reference number 2015 and sweeping the RX beam in the state of fixing the TX beam in sequence as shown in part (b) as denoted by reference number 2020.

According to an embodiment of the present invention, the measurement configuration (e.g., mmWaveConfig) transmitted from the macro eNB to the UE may include a mmW signal transmission period, a mmW signal transmission start offset, and mmW signal transmission time information. This information indicates a downlink transmission timing of the macro eNB.

The measurement configuration may include beamforming information. For example, the measurement configuration may include at least one of a number of TX beams of the high frequency cell, high frequency signal time slot information per TX beam, an order of TX beam sweeping, a number of repetitions of a TX beam before transmission of the next TX beam, and beam ID information. The measurement configuration may also include at least one of monitoring-target cell list information, cell monitoring order information, and measurement gap information determined considering a high frequency signal transmission period.

The measurement configuration may also include intra-/inter-frequency neighboring cell, particularly different RAT, information (UMTS, GSM, CDMA2000, HRPD, and 1xRTT information). The measurement configuration may also include criteria for an event triggering measurement report of the UE and quantity information. The measurement configuration may also include information mapping a measurement target and a measurement configuration as a measurement identifier. The measurement configuration may also include measurement quantity for use in assessing all events and related filtering information and RAT information for use in reporting a measurement result. The measurement configuration may also include information on the measurement gap with the current macro eNB for other measurement targets.

According to an embodiment of the present invention, the measurement report that the UE transmits to the macro eNB may include a measurement ID, a cell ID, a measurement beam ID, and a measurement result (reference signal received power (RSRP), reference signal received quality (RSRQ), and received signal code power (RSCP), and energy to noise ratio).

Figure 21:
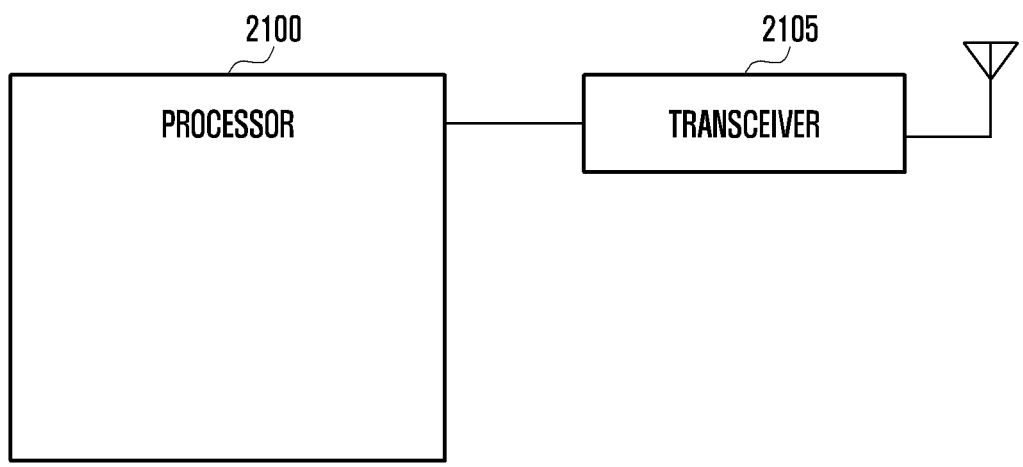
FIG. 21 is a block diagram illustrating a schematic configuration of a UE according to an embodiment of the present invention.

FIG. 21 is a block diagram illustrating a schematic configuration of a UE according to an embodiment of the present invention.

The UE may include at least one processor 2100 and a transceiver 2105.

The transceiver 2105 may communicate signals with other devices (e.g., MeNB and SeNB) under the control of the processor 2100.

According to various embodiments of the present invention, the processor 2100 may control the operations of the UE as described with reference to FIGS. 12 to 19. For example, the processor 2100 may include an LTE modem for LTE communication and a 5G modem for 5G communication.

Figure 22:
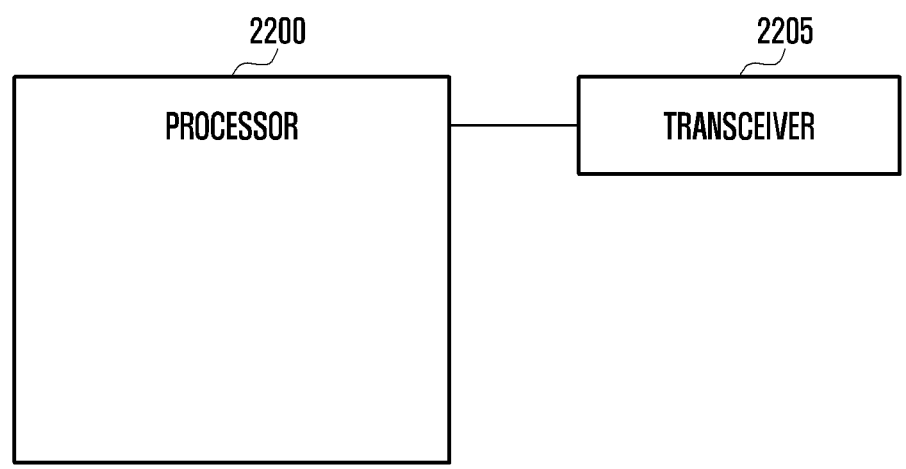
FIG. 22 is a block diagram illustrating a schematic configuration of an eNB according to an embodiment of the present invention.

FIG. 22 is a block diagram illustrating a schematic configuration of an eNB according to an embodiment of the present invention. The eNB configured as shown in FIG. 22 may be an LTE eNB (low frequency eNB and master eNB) or a 5G eNB (high frequency eNB and secondary cell eNB).

The eNB may include a processor 2200 and a transceiver 2205.

The transceiver 2205 may communicate signals with a UE through a radio communication link (LTE or 5G) and communicate signals with another eNB or device through a wired link under the control of the processor 2200.

According to various embodiments of the present invention, the processor 2200 may control the operations of the eNB (LTE eNB or 5G eNB) as described with reference to FIGS. 12 to 19. The above-described operations of the eNB and UE may be realized with a memory storing corresponding program codes inside an arbitrary component of the eNB or UE. That is, the controller of the eNB or the UE may execute the above-described operations by reading out the program codes stored in the memory device by means of a processor or a central processing unit (CPU).

The various components, modules composing an entity, an eNB, or a UE may be implemented in the form of a hardware circuit such as a complementary metal oxide semiconductor-based logic circuit, firmware, software and/or a combination of hardware and firmware, and/or a software element stored in a machine-readably medium. For example, various electrical structure and methods may be executed by means of electric circuits such as transistors, logic gates, and on-demand semiconductors.

Although the description has been made with reference to particular embodiments, the present invention can be implemented with various modifications without departing from the scope of the present invention. Thus, the present invention is not limited to the particular embodiments disclosed, and it will include the following claims and their equivalents.

The invention claimed is:

1. A method performed by a first base station in a wireless communication system, the method comprising:
transmitting, to a terminal, a first message including first information on a carrier frequency of at least one neighbouring cell and second information on a measurement configuration for the at least one neighbouring cell, wherein the second information is associated with synchronization reference signals (SSs) and a physical broadcast channel (PBCH);
receiving, from the terminal, a measurement report including a measurement result of the at least one neighbouring cell; and
transmitting, to the terminal, a second message for adding the at least one neighbouring cell of a second base station based on the measurement report,
wherein a system frame number of the second base station is associated with the PBCH.

2. The method of claim 1, wherein the second message includes system information of the second base station.

3. The method of claim 1,
wherein the first base station supports evolved universal terrestrial radio access (E-UTRA), and wherein the second base station supports new radio (NR), and
wherein the first message and the second message are a radio resource control (RRC) message.

4. The method of claim 3, further comprising:
transmitting, to the terminal, a request message requesting a capability of the terminal for a radio access technology type including a dual connectivity of the E-UTRA and the NR; and
receiving, from the terminal, a response message including information on the capability of the terminal for the dual connectivity.

5. A method performed by a terminal in a wireless communication system, the method comprising:
receiving, from a first base station, a first message including first information on a carrier frequency of at least one neighbouring cell and second information on a measurement configuration for the at least one neighbouring cell, wherein the second information is associated with synchronization reference signals (SSs) and a physical broadcast channel (PBCH);
performing a measurement for the at least one neighbouring cell, based on the first information and the second information;
transmitting, to the first base station, a measurement report including a measurement result of the at least one neighbouring cell; and
receiving, from the first base station, a second message for adding the at least one neighbouring cell of a second base station based on the measurement report,
wherein a system frame number of the second base station is associated with the PBCH.

6. The method of claim 5, wherein the second message includes system information of the second base station.

7. The method of claim 5,
wherein the first base station supports evolved universal terrestrial radio access (E-UTRA), and wherein the second base station supports new radio (NR), and
wherein the first message and the second message are a radio resource control (RRC) message.

8. The method of claim 7, further comprising:
receiving, from the first base station, a request message requesting a capability of the terminal for a radio access technology type including a dual connectivity of the E-UTRA and the NR; and
transmitting, to the first base station, a response message including information on the capability of the terminal for the dual connectivity.

9. A first base station in a wireless communication system, comprising:
a transceiver; and
a controller configured to:
control the transceiver to transmit, to a terminal, a first message including first information on a carrier frequency of at least one neighbouring cell and second information on a measurement configuration for the at least one neighbouring cell, wherein the second information is associated with synchronization reference signals (SSs) and a physical broadcast channel (PBCH),
control the transceiver to receive, from the terminal, a measurement report including a measurement result of the at least one neighbouring cell, and control the transceiver to transmit, to the terminal, a second message for adding the at least one neighbouring cell of a second base station based on the measurement report,
wherein a system frame number of the second base station is associated with the PBCH.

10. The first base station of claim 9, wherein the second message includes system information of the second base station.

11. The first base station of claim 9,
wherein the first base station supports evolved universal terrestrial radio access (E-UTRA),
wherein the second base station supports new radio (NR), and
wherein the first message and the second message are a radio resource control (RRC) message.

12. The first base station of claim 11, wherein the controller is further configured to:
control the transceiver to transmit, to the terminal, a request message requesting a capability of the terminal for a radio access technology type including a dual connectivity of the E-UTRA and the NR, and
control the transceiver to receive, from the terminal, a response message including information on the capability of the terminal for the dual connectivity.

13. A terminal in a wireless communication system, comprising:
a transceiver; and
a controller configured to:
control the transceiver to receive, from a first base station, a first message including first information on a carrier frequency of at least one neighbouring cell and second information on a measurement configuration for the at least one neighbouring cell, wherein the second information is associated with synchronization reference signals (SSs) and a physical broadcast channel (PBCH),
perform a measurement for the at least one neighbouring cell, based on the first information and the second information,
control the transceiver to transmit, to the first base station, a measurement report including a measurement result of the at least one neighbouring cell, and
control the transceiver to receive, from the first base station, a second message for adding the at least one neighbouring cell of a second base station based on the measurement report,
wherein a system frame number of the second base station is associated with the PBCH.

14. The terminal of claim 13, wherein the second message includes system information of the second base station.

15. The terminal of claim 13,
wherein the first base station supports evolved universal terrestrial radio access (E-UTRA), and wherein the second base station supports new radio (NR), and
wherein the first message and the second message are a radio resource control (RRC) message.

16. The terminal of claim 15, wherein the controller is further configured to:
control the transceiver to receive, from the first base station, a request message requesting a capability of the terminal for a radio access technology type including a dual connectivity of the E-UTRA and the NR, and
control the transceiver to transmit, to the first base station, a response message including information on the capability of the terminal for the dual connectivity.

* * * * *